(12) United States Patent
Al-Haddad et al.

(10) Patent No.: US 9,331,599 B2
(45) Date of Patent: May 3, 2016

(54) MULTILEVEL ELECTRIC POWER CONVERTER

(75) Inventors: Kamal Al-Haddad, Montreal (CA); Youssef Ounejjar, Montreal (CA); Luc-Andre Gregoire, Montreal (CA)

(73) Assignee: SOCOVAR S.E.C., Montreal, QC (CA)

( * ) Notice: Subject to any disclaimer, the term of this patent is extended or adjusted under 35 U.S.C. 154(b) by 1019 days.

(21) Appl. No.: 13/128,382

(22) PCT Filed: Nov. 10, 2009

(86) PCT No.: PCT/CA2009/001633
§ 371 (c)(1),
(2), (4) Date: Jul. 25, 2011

(87) PCT Pub. No.: WO2010/051645
PCT Pub. Date: May 14, 2010

(65) Prior Publication Data
US 2011/0280052 A1    Nov. 17, 2011

Related U.S. Application Data

(60) Provisional application No. 61/112,809, filed on Nov. 10, 2008.

(51) Int. Cl.
*H02M 7/48*     (2007.01)
*H02M 7/483*    (2007.01)
*H02M 7/00*     (2006.01)

(52) U.S. Cl.
CPC .............. *H02M 7/483* (2013.01); *H02M 7/003* (2013.01); *Y10T 29/49117* (2015.01)

(58) Field of Classification Search
CPC ................. H02M 2007/4835; H02M 7/003; H02M 7/483; H02M 7/42; H02M 7/44
USPC ................. 363/71, 97, 127, 131, 132, 62
See application file for complete search history.

(56) References Cited

U.S. PATENT DOCUMENTS

| | | | | |
|---|---|---|---|---|
| 6,480,403 | B1 * | 11/2002 | Bijlenga | H02M 7/487 363/132 |
| 6,998,900 | B2 * | 2/2006 | Kamijo | H02M 3/07 327/536 |
| 7,710,082 | B2 * | 5/2010 | Escobar Valderrama et al. | H02J 3/1857 323/207 |
| 2004/0164792 | A1 * | 8/2004 | Yokoyama | H03F 3/2173 330/10 |
| 2005/0127853 | A1 * | 6/2005 | Su | H02M 7/487 318/108 |

* cited by examiner

*Primary Examiner* — Jue Zhang
*Assistant Examiner* — Lakaisha Jackson
(74) *Attorney, Agent, or Firm* — Norton Rose Fulbright Canada LLP

(57) ABSTRACT

There is described a multilevel electric power converter circuit comprising: $N_S$ switching elements connected in series in a closed loop; $N_{AE}$ additional elements, the additional elements being one of a direct current source and at least one passive element, connected within the closed loop such that each additional element is connected to four of the switching elements, the ratio of a number of additional elements $N_{AE}$ to a number of switching elements $N_S$ corresponding to $N_S=2N_{AE}+2$; and one of a load and an alternating current source connected across the closed loop at nodes between adjacent switching elements that are separate from nodes to which the additional elements are connected.

24 Claims, 20 Drawing Sheets

$V_{output} = E1$

State 1

$V_{output} = E1 - E2$

State 2

$V_{output} = E2$

State 3

$V_{output} = 0$

State 4

$V_{output} = 0$

State 4'

$V_{output} = -E2$

State 5

$V_{output} = E2-E1$

State 6

$V_{output} = -E1$

State 7

MULTILEVEL ELECTRIC POWER CONVERTER

CROSS-REFERENCE TO RELATED APPLICATIONS

The present application claims priority under 35 USC 119 (e) of U.S. Provisional Patent Application No. 61/112,809, filed on Nov. 10, 2008, the contents of which are hereby incorporated.

TECHNICAL FIELD

The present invention relates to the field of conversion of direct current (DC) to alternating current (AC) and vice versa, and more specifically, to converters (inverters and rectifiers) that are multilevel.

BACKGROUND

An inverter is an electrical circuit that converts direct current (DC) to alternating current (AC). Inverters are used in a wide range of applications, from small switching power supplies in computers, to large electric utility applications that transport bulk power. A rectifier is an electrical circuit used to convert AC into DC current. The output of the rectifier is essentially half-AC current, which is then filtered into DC. For the purpose of the present specification, inverters and rectifiers will be referred to as converters when both devices are being referred to.

Converters are known to cause harmonics in their environments, such as within the supply network or in sensitive equipment connected to the same line. To limit the harmonics that can be induced into a system, various norms have been established, such as the IEC 1000-3-2 and the EN61000-3-2 standards. In order to meet these standards, two techniques are known to reduce harmonics. The first technique is to apply filters that block the harmonics. This solution is costly and cumbersome. The second technique is the use of multilevel converters.

Multilevel converters reduce harmonics by providing an AC waveform that exhibits multiple steps at several voltage levels. The closer the waveform comes to a perfect sine wave, the less likely it is that harmonics be present. Known topologies for multilevel converters are the Neutral Point Diode Clamped Multilevel Converters, the Flying Capacitor Multilevel Converters, and the Cascaded H-Bridge Multilevel Converters. While all three of these topologies are successful in reducing harmonics, they quickly become bulky and constricting when the number of levels exceeds three, due to the large number of both active and passive components present in the circuits.

Therefore, there is a need to reduce the number of components required in a multilevel converter, while maintaining a high efficiency and generating waveforms of high quality.

SUMMARY

In accordance with a first broad aspect of the present invention, there is provided a multilevel electric power converter circuit comprising: $N_s$ switching elements connected in series in a closed loop; $N_{AE}$ additional elements, the additional elements being one of a direct current source and at least one passive element, connected within the closed loop such that each additional element is connected to four of the switching elements, the ratio of a number of additional elements $N_{AE}$ to a number of switching elements NS corresponding to $N_S=2N_{AE}+2$; and one of a load and an alternating current source connected across the closed loop at nodes between adjacent switching elements that are separate from nodes to which the additional elements are connected.

In accordance with a second broad aspect of the present invention, there is provided a method for providing a multilevel electric power converter circuit, the method comprising: connecting $N_s$ switching elements in series in a closed loop; connecting within the closed loop $N_{AE}$ additional elements, the additional elements being one of a direct current source and at least one passive element, each additional element being connected to four of the switching elements, the ratio of a number of additional elements $N_{AE}$ to a number of switching elements NS corresponding to $N_S=2N_{AE}+2$; and connecting one of a load and an alternating current source across the closed loop at nodes between adjacent switching elements that are separate from nodes to which the additional elements are connected.

BRIEF DESCRIPTION OF THE DRAWINGS

Further features and advantages of the present invention will become apparent from the following detailed description, taken in combination with the appended drawings, in which:

FIG. 20b illustrates the output voltage for the waveforms of FIG. 20a;

FIG. 21b illustrates the output voltage for the waveforms of FIG. 21a;

FIG. 22b illustrates the output voltage for the waveforms of FIG. 22a;

It will be noted that throughout the appended drawings, like features are identified by like reference numerals.

DETAILED DESCRIPTION

There is described a topology for a multilevel electric power converter. The converter can be operated in inverter mode and in rectifier mode. The topology can be classified as a mid-point between a flying capacitor and a cascaded H-bridge inverter topology. Compared to these topologies, the present design uses a smaller number of switching elements. Moreover, in inverter mode, it allows the reduction of the number of transformers. In rectifier mode, it results in multiple output voltages which are independent, so a first one can be used as a DC bus and a second one as an auxiliary output voltage, for example. An impact on a utility supply is limited. Modulation frequency can be very low which improves the energetic efficiency of the installation. Various control strategies are designed to produce a nearly sinusoidal current and to alleviate the harmonic content of the output voltage. Filters can thus be smaller and/or eliminated.

Figure 1:
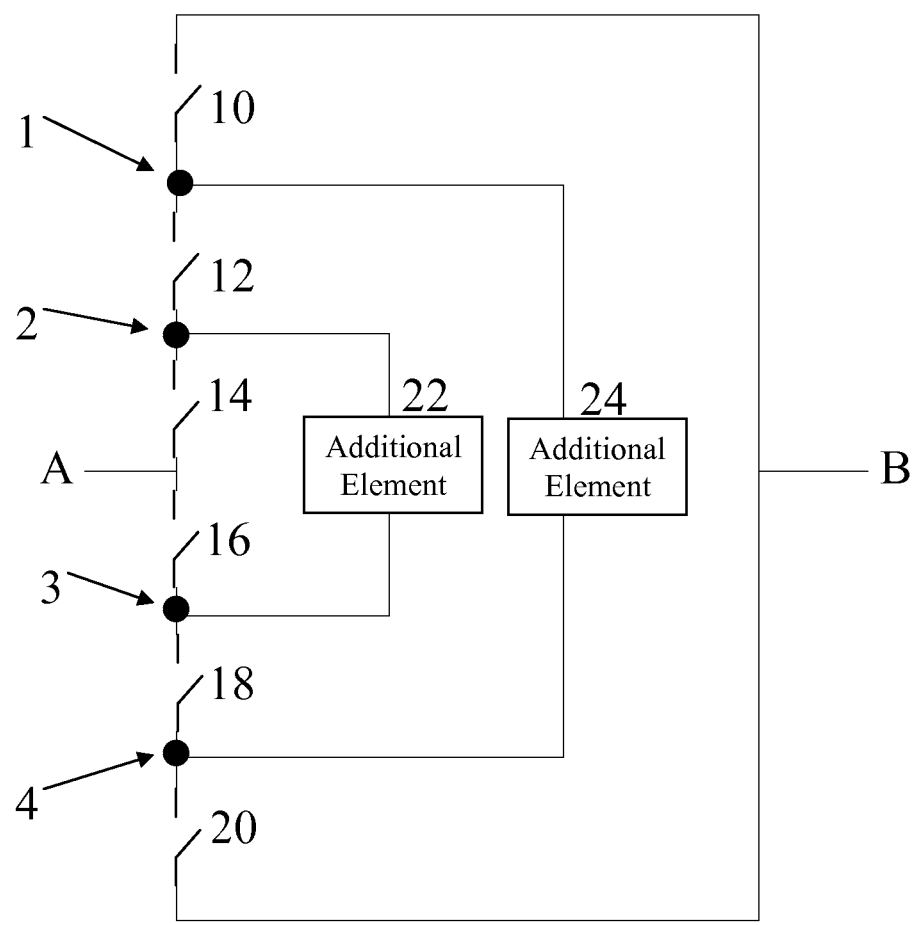
FIG. 1 is a generic schematic of a seven level converter in accordance with an embodiment of the present invention.

FIG. 1 illustrates a generic version of the topology of the multilevel electric power converter, in accordance with one embodiment. In rectifier mode, an alternating current source is connected across terminals A and B. In inverter mode, a load is connected across terminals A and B. In both cases, terminals A and B correspond to the only nodes in the circuit where only switching elements are connected and no additional elements are connected.

Switching elements 10, 12, 14, 16, 18, and 20 are disposed such that selective opening and closing of the switches will result in given voltage levels. Elements 22 and 24 can be either DC sources (i.e. batteries) or passive elements such as capacitors and combinations of capacitors and resistors and/ or inductors. The capacitors are used as auxiliary power sources. The DC sources are present when the circuit is an inverter; the passive elements are present when the circuit is a rectifier. Switch 10 is provided between node 1 and terminal B. Switch 12 is provided between node 1 and node 2. Switch 14 is provided between node 2 and terminal A. Switch 16 is provided between terminal A and node 3. Switch 18 is provided between node 3 and node 4. Switch 20 is provided between node 4 and terminal B. Each additional element is connected to a node having four switches connected thereto. Element 22 is provided between nodes 2 and 3. Element 24 is provided between terminals 1 and 4. The configuration of FIG. 1 may be a 5-level or a 7-level converter, depending on the chosen variables for the control strategy. This will be explained in more detail below.

Figure 2:
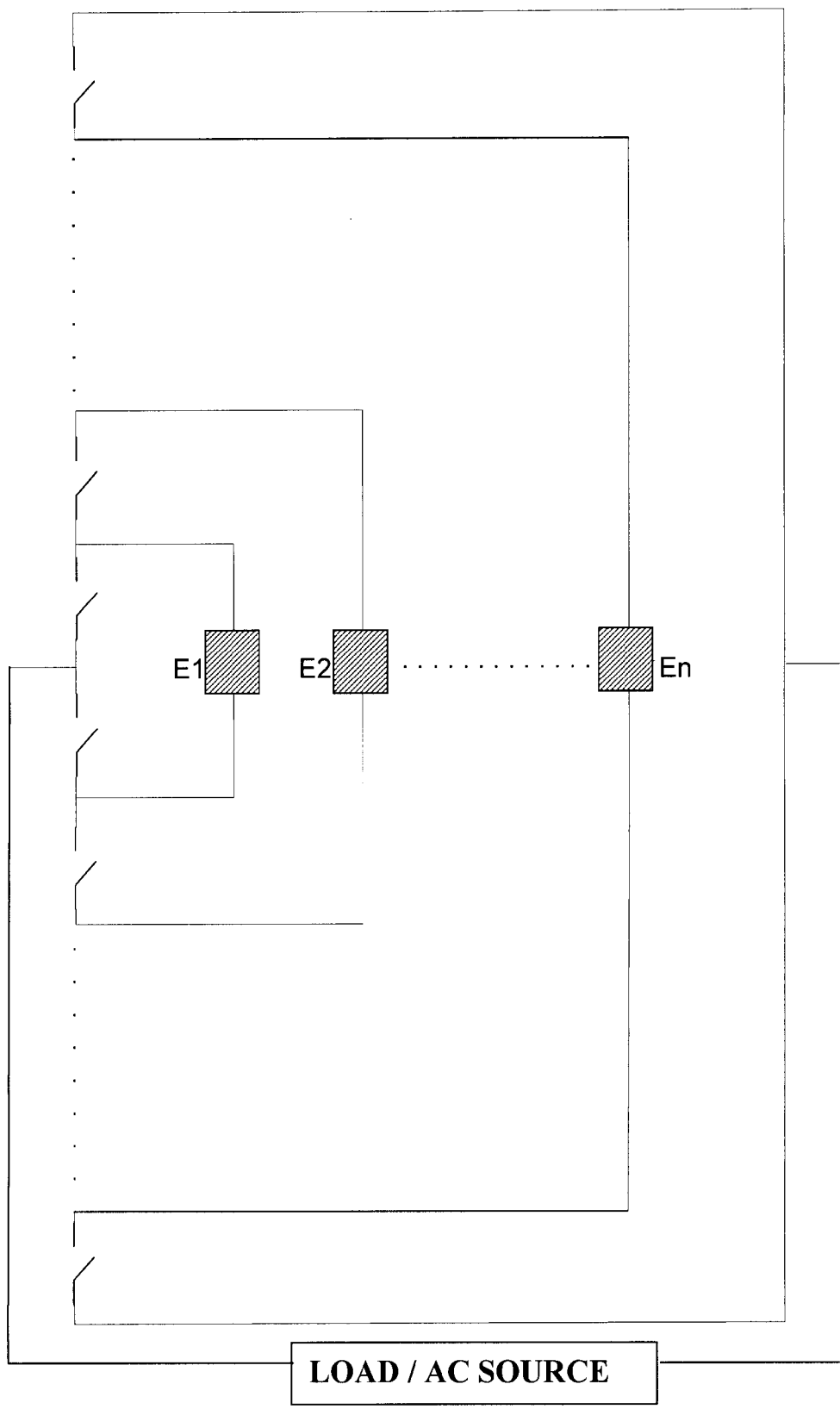
FIG. 2 is a schematic illustrating an N-level converter in a configuration similar to a flying capacitor multilevel inverter.

FIG. 2 illustrates an N-level converter, whereby each added "stage" of the converter includes two switches and an additional element (either one of a battery or a capacitor) $E_n$, connected in a U shape and inserted between the last stage and the second to last stage. Similarly, FIG. 3 illustrates an N-level converter as well, with each added stage of the converter including two switches and an additional element (either one of a battery or a capacitor) $E_n$, connected in a U shape and inserted between the upper two stages and the lower two stages.

Figure 3:
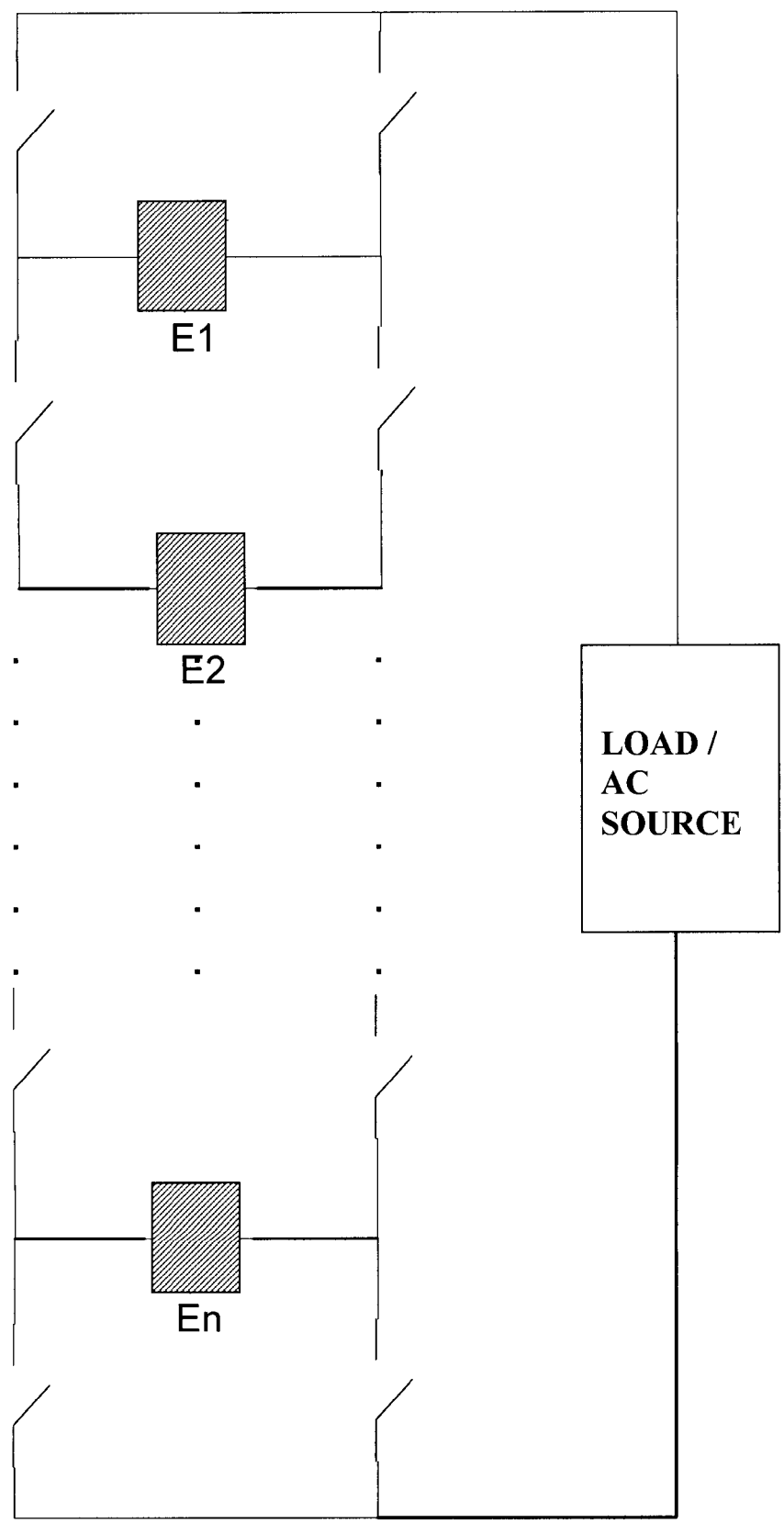
FIG. 3 is a schematic of an N level converter in accordance in a configuration similar to a cascaded H-Bridge inverter.

While it may appear that the components of FIG. 3 are connected differently than those in FIG. 2, careful analysis of the designs will show that the topologies are in fact the same. The switches are still between the same nodes, the DC sources are between the same nodes, and the load/AC source is between terminals A and B which is provided at the same place in the circuit. The circuit of FIG. 3 has been arranged to resemble a classic cascaded H-Bridge inverter topology, while that of FIG. 2 is arranged to resemble a standard flying capacitor multilevel inverter configuration.

Figure 4:
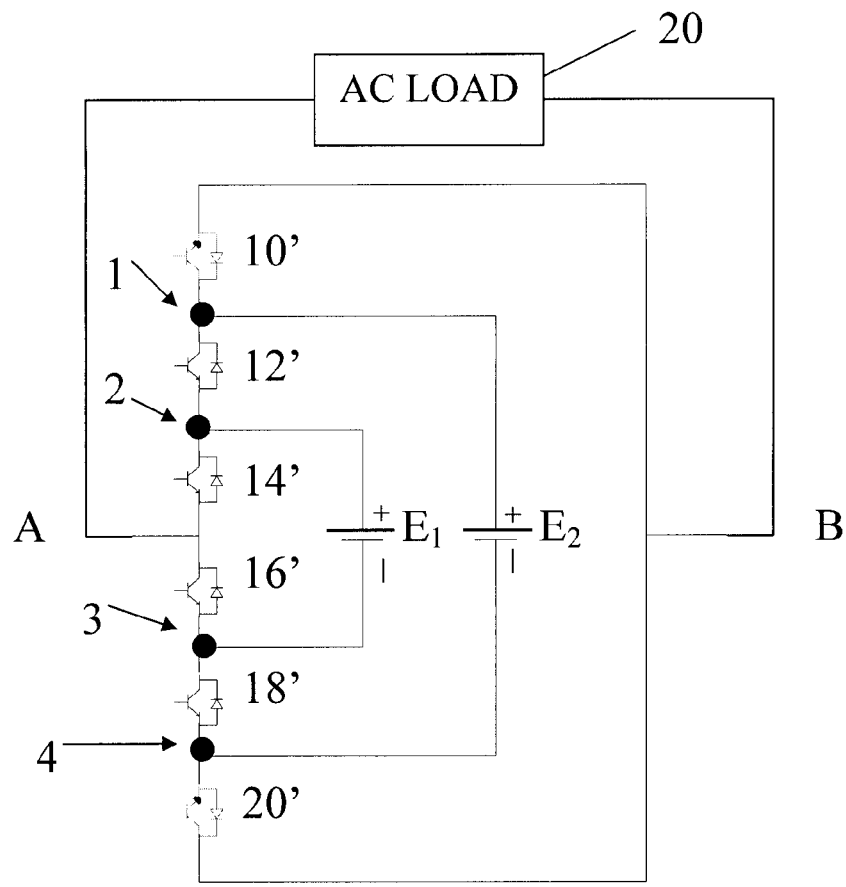
FIG. 4 is a schematic of a seven level inverter in accordance with an embodiment of the present invention in a configuration similar to a flying capacitor multilevel inverter.

FIG. 4 illustrates an embodiment for a seven level inverter using the configuration illustrated in FIG. 2. The switching elements (10', 12', 14', 16', 18', 20') are implemented using bipolar junction transistors (BJT). A parasitic diode, implicitly present due to the nature of the BJT, is illustrated to indicate the direction of bias of the transistors, namely reverse bias, such that the transistors behave as switches and not as short circuits. While the figures illustrate the switches as BJTs, it should be noted that alternative means of implementing the switches are possible, such as thyristors, relays, isolated gate bi-polar transistors (IBGT), MOSFETS, and others.

DC sources $E_1$ and $E_2$ are present between nodes 2 and 3 and nodes 1 and 4, respectively. An AC Load 26 is connected across terminals A and B. The circuit of FIG. 4 is a seven or five level inverter because it can generate seven/five different output voltages using the various combinations of switches at on/off states.

Figure 5:
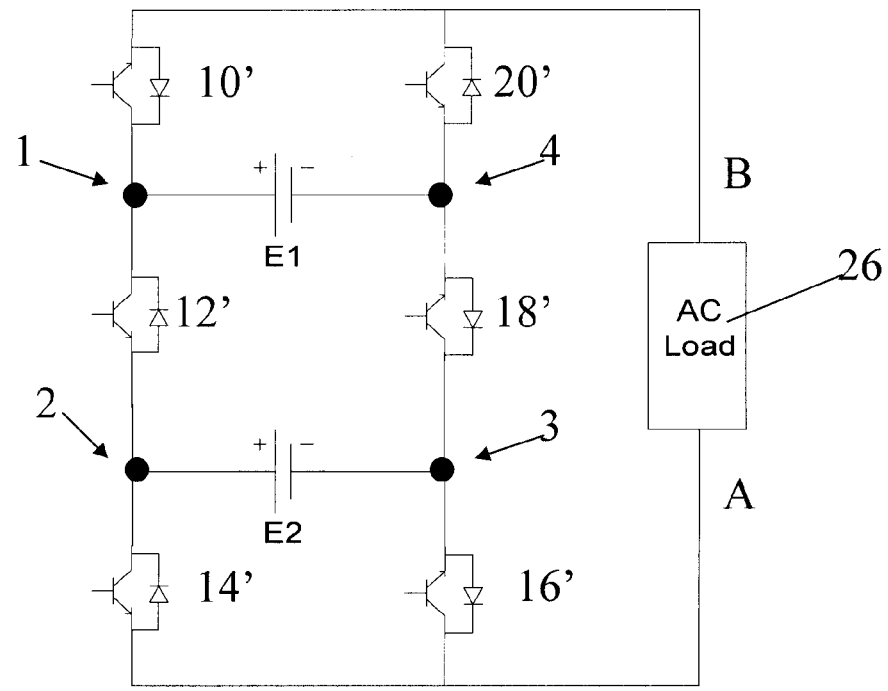
FIG. 5 is a schematic of a seven level inverter in accordance with an embodiment of the present invention in a configuration similar to a cascaded H-Bridge inverter.

FIG. 5 is another embodiment of a seven/five level inverter, using the configuration of FIG. 3. In this embodiment, the switching elements (10', 12', 14', 16', 18', 20') are again implemented using bipolar junction transistors (BJT) The switches (10', 12', 14', 16', 18', 20') are provided between the same nodes as shown in FIG. 4.

When compared to three prior art multilevel inverter configurations, the present design has a lower number of capacitors and switches for an equal number of levels. The table below illustrates this comparison for a seven level inverter.

TABLE 1

|  | NPC | FCC | Cascaded H-bridge | Present topology |
|---|---|---|---|---|
| Capacitors | 6 | 6 | 2 | 2 |
| Clamping diodes | 10 | 0 | 0 | 0 |
| Switches | 12 | 12 | 8 | 6 |

NPC refers to Neutral Point Converters and FCC refers to Flying Capacitor Converters. As can be seen from Table 1, the present topology has two capacitors and six switches for a seven level inverter, which is less capacitors than the NPC and FCC topologies, and less switches than the NPC, FCC, and Cascaded H-Bridge topologies. Moreover, in the proposed multilevel electric power converter, the switch which must support the highest voltage operates at the lowest switching frequency, and vice-versa. This reduces switch stress and improves the performance of the multilevel electric power converter.

FIGS. 6A-6dH illustrate the active switches for each possible $V_{output}$ when using the configuration of FIG. 5 to produce seven levels in inverter mode. Switches 20', 18', and 16' operate complementarily to switches 10', 12', 14', respectively. As is noted from Table 2, two possible combinations of switches will lead to a $V_{output}$ of zero.

This is illustrated in table 2 below.

TABLE 2

| State | $V_{output}$ | Switch 10' | Switch 12' | Switch 14' |
|---|---|---|---|---|
| 1 | E1 | 1 | 0 | 0 |
| 2 | E1 − E2 | 1 | 0 | 1 |
| 3 | E2 | 1 | 1 | 0 |
| 4 | 0 | 0 | 0 | 0 |
| 4' | 0 | 1 | 1 | 1 |
| 5 | −E2 | 0 | 0 | 1 |
| 6 | E2 − E1 | 0 | 1 | 0 |
| 7 | −E1 | 0 | 1 | 1 |

Figure 6A:
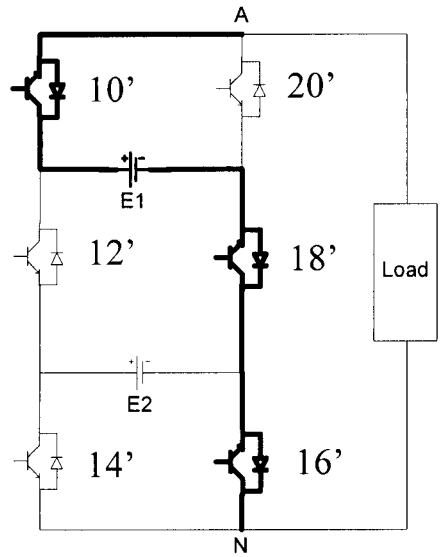
FIGS. 6A-6H show the active switches for the circuit of FIG. 3 for all possible combinations of on/off.
Figure 6B:
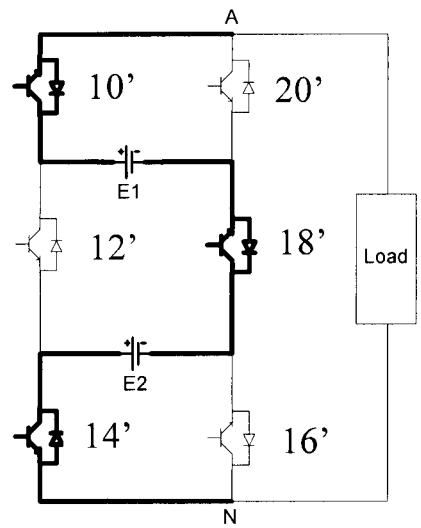
Figure 6C:
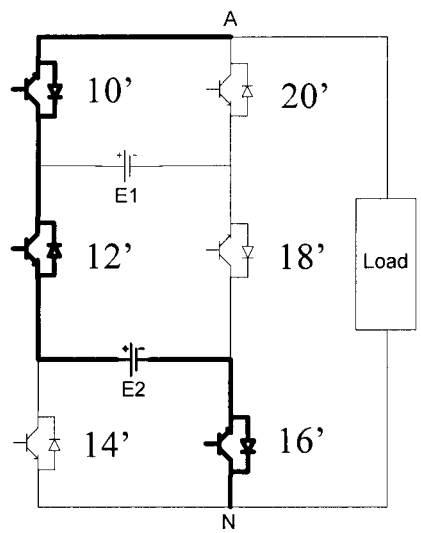
Figure 6D:
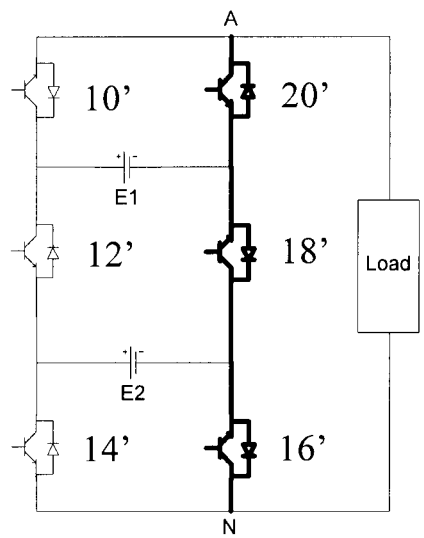
Figure 6E:
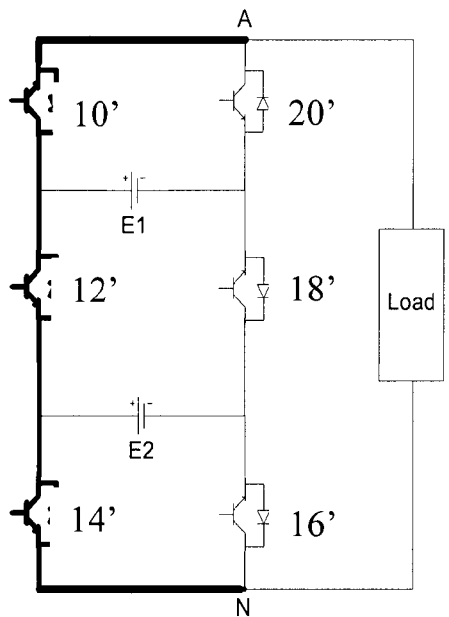
Figure 6F:
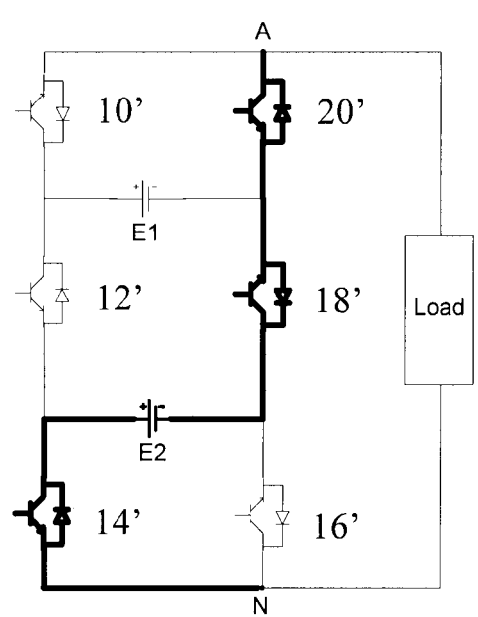
Figure 6G:
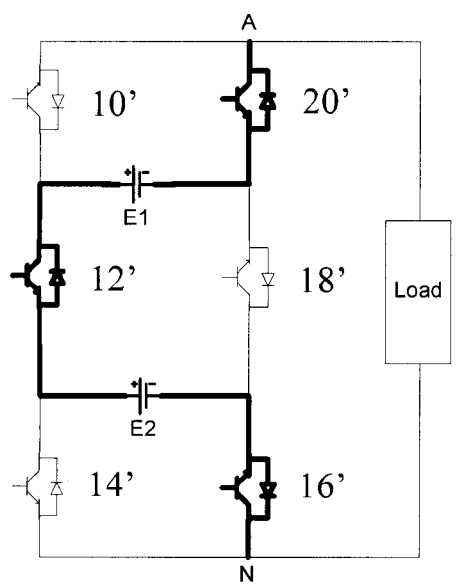
Figure 6H:
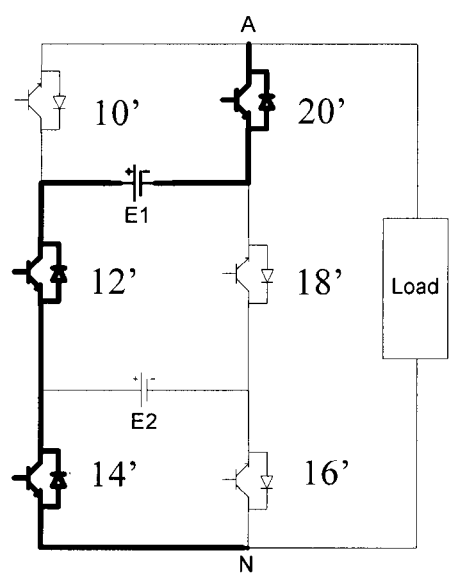

In FIG. 6A, switches 10', 18', and 16' are activated, leading to an output of E1. The remaining FIGS. 6B to 6H are self-explanatory when combined with Table 2.

Various control strategies may be used with the multilevel electric power converter described herein. In one exemplary embodiment, an average model is used to design a control strategy. This average model is based on the circuit topology found in FIG. 7, which illustrates a seven-level rectifier. An AC source inputs an alternating current into the circuit.

Let $S_i$ be a switching function of switch $T_i$ where i={1, 2, 3}. Switches $T_i$ and $T_i'$ operate complementarily. $S_i$ is defined by:

$$S_i = \begin{cases} 1 \text{ if } T_i \text{ is ON} \\ 0 \text{ if } T_i \text{ is OFF} \end{cases} \quad (1)$$

Figure 7:
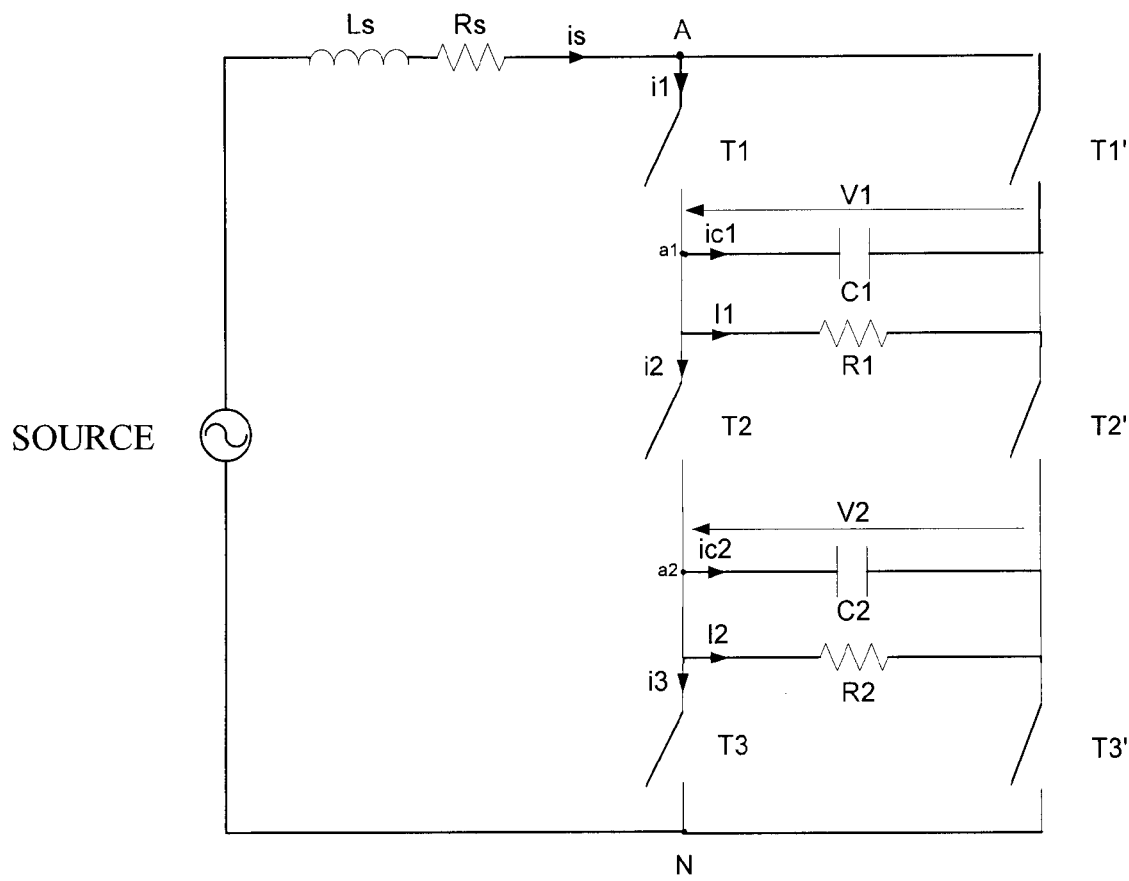
FIG. 7 is an exemplary circuit on which an average model for control of the converter is based.

From FIG. 7, we can write:

$$\begin{cases} V_{Aa1} = -S1 \cdot V1 \\ V_{a1a2} = S2(V1 - V2) \\ V_{a2N} = S3 \cdot V2 \end{cases} \quad 2)$$

We can also write:

$$\begin{cases} i1 = S1 \cdot is \\ i2 = S2 \cdot is \\ i3 = S3 \cdot is \end{cases} \quad 3)$$

Adding $V_{Aa1}$, $V_{a1a2}$ and $V_{a2N}$ gives:

$$V_{AN} = V_{Aa1} + V_{a1a2} + V_{a2N} = (S2-S1).V1 + (S3-S2).V2 \quad (4)$$

Applying Kirchhoff's Current Law (KCL) to node $a_1$ gives:

$$i1 = i2 + ic1 + I_1 \quad (5)$$

$i_{c1}$ and $I_1$ are the $C_1$ capacitor current and the $C_1$ capacitor load current respectively.

$$ic1 = C1 \cdot \frac{dV1}{dt} = i1 - i2 - I_1 \quad (6)$$

Thus, we can write:

$$\frac{dV1}{dt} = \frac{(S1 - S2) \cdot is}{C1} - \frac{I_1}{C1} \quad (7)$$

Similarly, applying Kirchhoff's Current Law (KCL) to node $a_2$ gives:

$$i2 = i3 + ic2 + I_2 \quad (8)$$

So we can conclude:

$$\frac{dV2}{dt} = \frac{(S2 - S3) \cdot is}{C2} - \frac{I_2}{C2} \quad (9)$$

Applying Kirchhoff's Voltage Law to the converter input loop gives:

$$V_{AN} = -R_s \cdot is - L_s \frac{dis}{dt} + e_s \quad (10)$$

By comparing (4) and (10), we can conclude:

$$\frac{dis}{dt} = \frac{e_s - R_s is - (S2 - S1) \cdot V1 - (S3 - S2) \cdot V2}{L_s} \quad (11)$$

Let d1, d2, d3 and d4 be duty cycles of switches T1, T2, T3 and T4 respectively. Duty cycles are defined by:

$$d1 = \frac{1}{Ts} \int_0^{Ts} S1 \, dt \quad (12)$$

$$d2 = \frac{1}{Ts} \int_0^{Ts} S2 \, dt$$

$$d3 = \frac{1}{Ts} \int_0^{Ts} S3 \, dt$$

$$d4 = \frac{1}{Ts} \int_0^{Ts} S4 \, dt$$

$T_s$ is the switching period.

Figure 8:
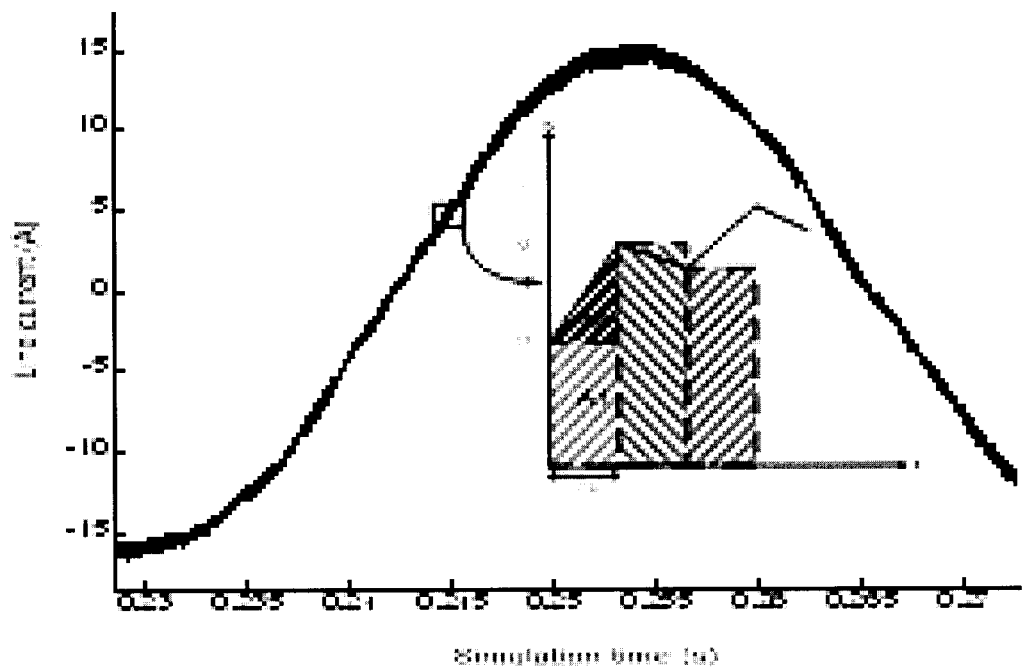
FIG. 8 is a graph illustrating a curve with a zoom on the line current for a small portion of the curve.

From FIG. 8 we can write:

$$\bar{I} = \frac{1}{T_s}\int_0^{T_s} i_s \cdot dt = \frac{1}{T_s}(T_s \cdot I_1) + \frac{1}{T_s}\left(T_s \cdot \frac{I_2 - I_1}{2}\right) \quad (13)$$

If we consider the two following areas:

$A_1 = T_s \cdot I_1$ is the shaded area A1

$$A_2 = T_s \cdot \frac{I_2 - I_1}{2}$$

is the shaded area A2

We can consider that $A_1 \gg A_2$. So we can assume the line current to be constant in a switching period. Thus, we can conclude that:

$$\frac{1}{T_s}\int_0^{T_s} S_i \cdot i_s \cdot dt = \frac{i_s}{T_s}\int_0^{T_s} S_i \cdot dt = i_s \cdot d_i \quad (14)$$

Let $x_1$, $x_2$, $x_3$ and $x_4$ be the state variables of the source-converter-load system defined by:

$x_1 = i_s, x_2 = V1$ and $x_3 = V2$

Then, the system state equation is given by:

$$\begin{cases} \dfrac{dx_1}{dt} = \dfrac{e_s - R_s x_1 - (d2-d1)\cdot x_2 - (d3-d2)\cdot x_3}{L_s} \\ \dfrac{dx_2}{dt} = \dfrac{(d1-d2)\cdot x_1}{C1} - \dfrac{I_1}{C1} \\ \dfrac{dx_3}{dt} = \dfrac{(d2-d3)\cdot x_1}{C2} - \dfrac{I_2}{C2} \end{cases} \quad (15)$$

Figure 9:
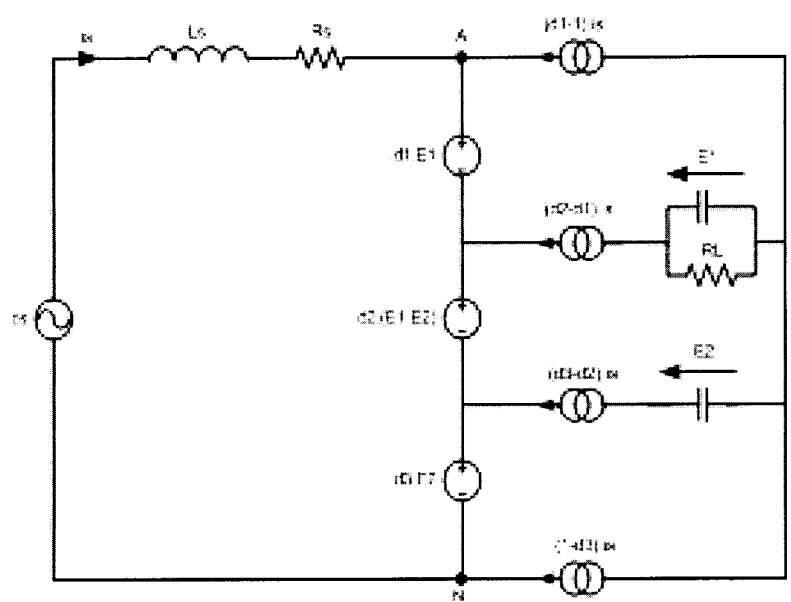
FIG. 9 is an average model of the proposed topology.

Thus, the average model of the proposed topology is shown in FIG. 9.

By considering the duty cycles as inputs:

$u1 = d1, u2 = d2$ and $u3 = d3$

The model of the source-converter-load system can be written by the following matrix equation:

$$\frac{dX}{dt} = F(X) + G(X) \cdot U + C \quad (16)$$

Where:

$$X = \begin{bmatrix} x1 \\ x2 \\ x3 \end{bmatrix},$$

$$F(X) = \begin{bmatrix} \dfrac{-R_s x_1}{L_s} \\ 0 \\ 0 \end{bmatrix},$$

$$C = \begin{bmatrix} \dfrac{e_s}{L_s} \\ \dfrac{-I_1}{C1} \\ \dfrac{-I_2}{C2} \end{bmatrix},$$

$$U = \begin{bmatrix} u_1 \\ u_2 \\ u_3 \end{bmatrix} \text{ and}$$

$$G(X) = \begin{bmatrix} \dfrac{x_2}{L_s} & \dfrac{x_3 - x_2}{L_s} & \dfrac{-x_3}{L_s} \\ \dfrac{x_1}{C1} & \dfrac{-x_1}{C1} & 0 \\ 0 & \dfrac{x_1}{C2} & \dfrac{-x_1}{C2} \end{bmatrix}$$

The determinant of matrix G is null, then G is not invertible. Noting that state variables $x_2$ and $x_3$ serve to generate the $x_1$ reference, then we can exclude one of them, and with the following supposition, the problem is solved:

$$u_1 + u_2 + u_3 = 1.5 \quad (17)$$

Inputs $u_1$, $u_2$ and $u_3$ vary between 0 and 1, then we have chosen to center them in their variation intervals. This justifies the proposition in equation (17). Applying a Proportional Integrator (PI) linear control method to each subsystem gives:

$$u_{11} = -(x_{1ref} - x_1)\left(K_{p11} + \frac{K_{i11}}{s}\right) \quad (18)$$

$$u_{21} = -(x_{2ref} - x_2)\left(K_{p21} + \frac{K_{i21}}{s}\right)$$

$$u_{31} = -(x_{3ref} - x_3)\left(K_{p31} + \frac{K_{i31}}{s}\right)$$

The reference of the variable $x_2$ is the desired DC link voltage, whereas, $x_3$ and $x_4$ references are respectively the three seventh and one seventh of $x_2$ reference. The $x_1$ reference is the sum of $u_{21}$, $u_{31}$ and $u_{41}$.

Finally, the input vector is given by:

$$\begin{bmatrix} u_1 \\ u_2 \\ u_3 \end{bmatrix} = \begin{bmatrix} \dfrac{x_2 + x_3}{3x_1 x_3} & \dfrac{-1}{3x_2} & \dfrac{1}{3} \\ \dfrac{x - 2x_3}{3x_1 x_2} & \dfrac{2}{3x_2} & \dfrac{1}{3} \\ \dfrac{-2x_2 - x_3}{3x_1 x_2} & \dfrac{-1}{3x_2} & \dfrac{1}{3} \end{bmatrix} \begin{bmatrix} u_{11} + \dfrac{R_s x_1 - e_s}{L_s} \\ u_{31} + \dfrac{I_2}{C2} \\ 1.5 \end{bmatrix} \quad (19)$$

This proposed control strategy offers the possibility of changing the number of voltage levels simply by varying the ratio $$k = \frac{x_{3ref}}{x_{2ref}}.$$

If $$k = \frac{1}{2},$$

then the number of voltage levels is 5, however, if $$k = \frac{1}{3},$$

the number of voltage levels becomes 7.

In order to reduce switching losses, simulation was done with a very low switching frequency at just ten times source frequency. Simulation parameters are:

fs=600 Hz: switching frequency

Ls=3 mH: line inductance $e_s$=120√2 sin(ωt): source voltage

In order to verify the system dynamics, the DC link voltage reference is changed at time 4 s from 200V to 250V. The upper capacitor load is changed at time 2 s from 25Ω to 15Ω, whereas the lower capacitor load is changed at time 6 s from 50Ω to 25Ω. For Five level rectifier operation $$\left(k = \frac{1}{2}\right),$$

the auxiliary voltage reference is controlled to be the half of the DC bus voltage.

Figure 10:
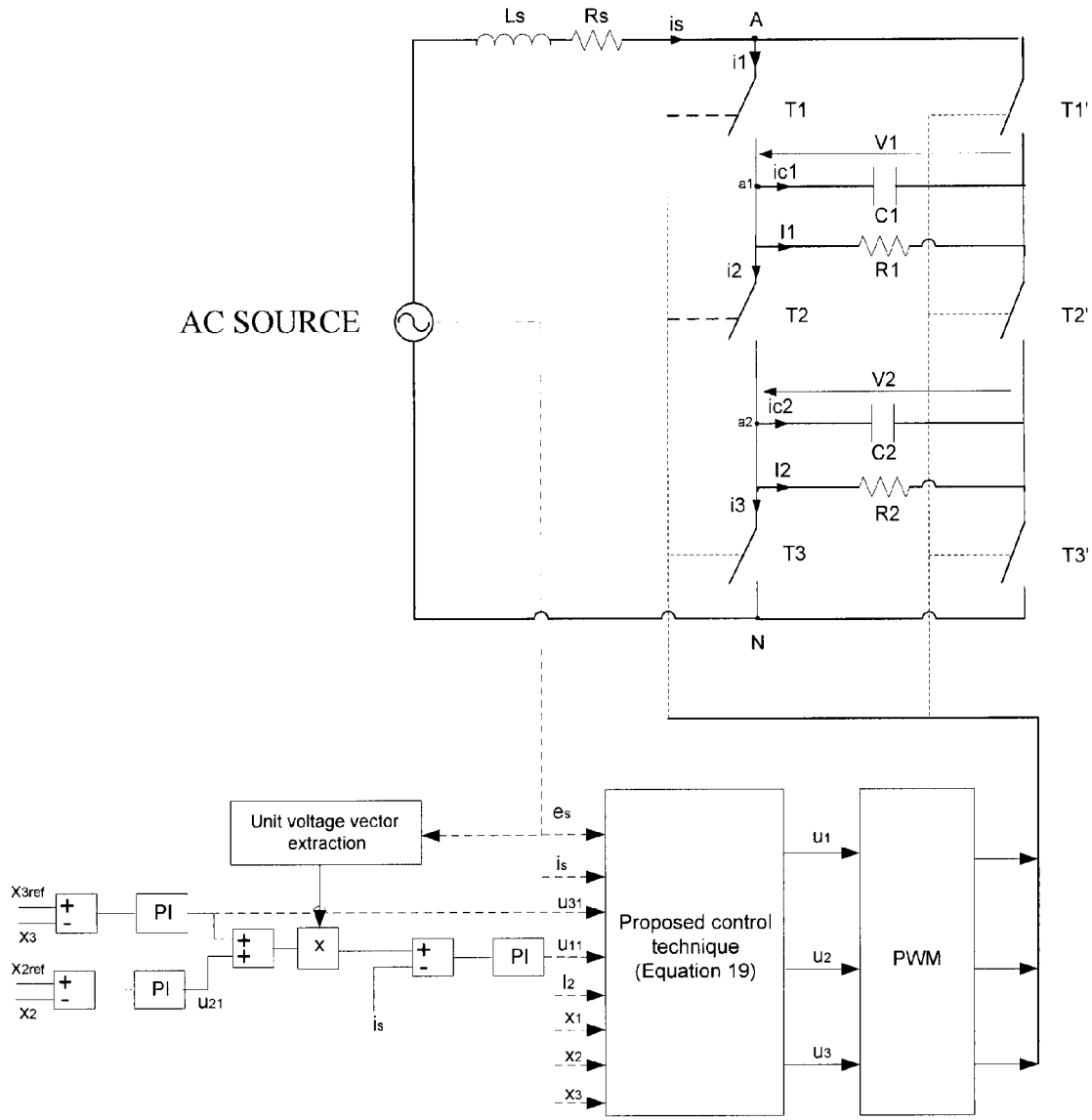
FIG. 10 is a schematic of the circuit of FIG. 7 with an exemplary control system.

FIG. 10 illustrates the seven level rectifier of FIG. 7 with the above-modeled control circuit connected thereto. Control signals are provided to the switching elements T1, T2, T3, T1', T2', T3'. Two independent output DC voltages are generated, one across R1 and another one across R2. The alternating current $i_s$ has a substantially sinusoidal waveform with harmonics as low as 1%. The reference of the state variable $x_2$ is the desired DC link voltage, whereas the $x_3$ reference is the half/third of the $x_2$ reference. A line current reference is then generated by multiplying a unit vector which is in phase with the source voltage and the sum of variables $u_{21}$ and $u_{31}$. Duty cycles are obtained using equation 19. The switch pulses are generated using a saw tooth modulator stage (PWM).

Figure 11:
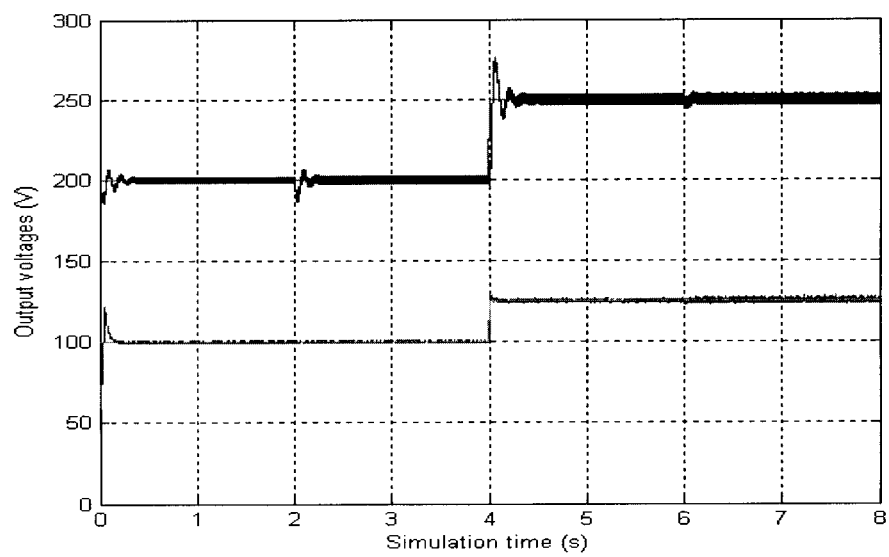
FIG. 11 is a graph illustrating the DC link and auxiliary output voltage for five levels of operation (auxiliary DC-bus voltage is half of the principal DC-bus)
Figure 12:
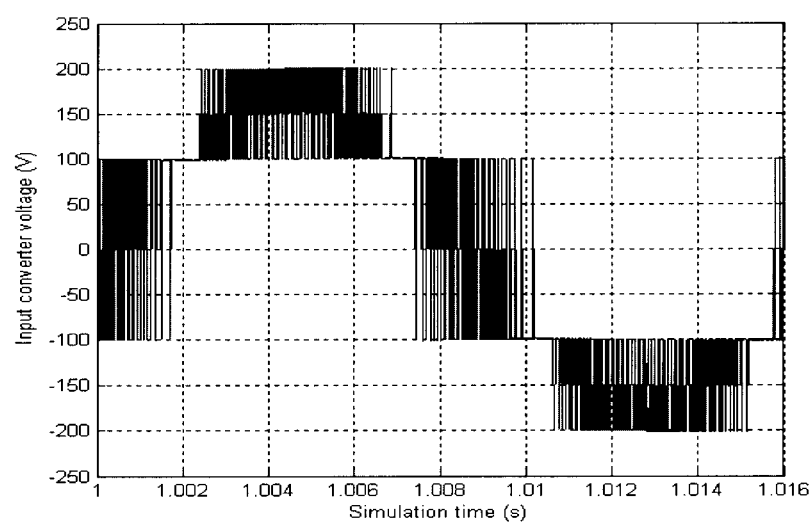
FIG. 12 is a graph showing the rectifier input voltage for the circuit of FIG. 5 for five levels of operation.

FIG. 11 shows a very good dynamic response of the output voltages from FIG. 10, which are very smooth. FIG. 12 shows the rectifier input voltage which is constituted from five levels. This reduces the harmonic contents compared to three level topologies.

The present multilevel electric power converter presents the possibility of changing the number of voltage levels from five to seven, or vice-versa, only by acting on the ratio $$k = \frac{x_{3ref}}{x_{2ref}}.$$

This is obtained when decreasing the auxiliary voltage from $$\frac{x_{2ref}}{2} \text{ to } \frac{x_{2ref}}{3}.$$

Figure 13:
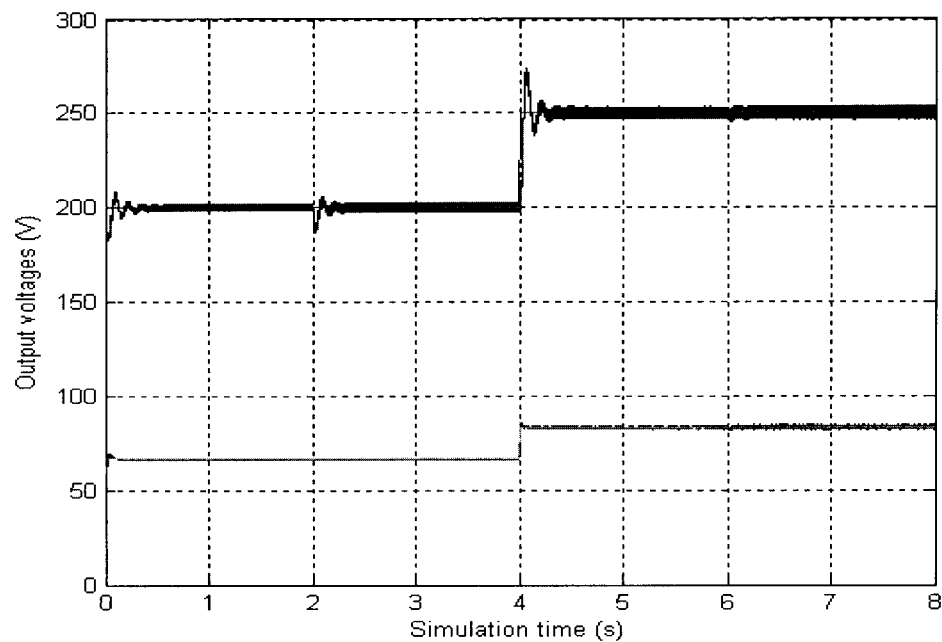
FIG. 13 is a graph showing the DC link and auxiliary output voltage for seven levels of operation (auxiliary DC-bus voltage is third of the principal DC-bus)

The auxiliary voltage reference is now controlled to be the third of the DC bus voltage. Simulation was made with the same parameters as presented above. FIG. 13 shows a very good dynamic response. Output voltage ripples are very small.

Figure 14:
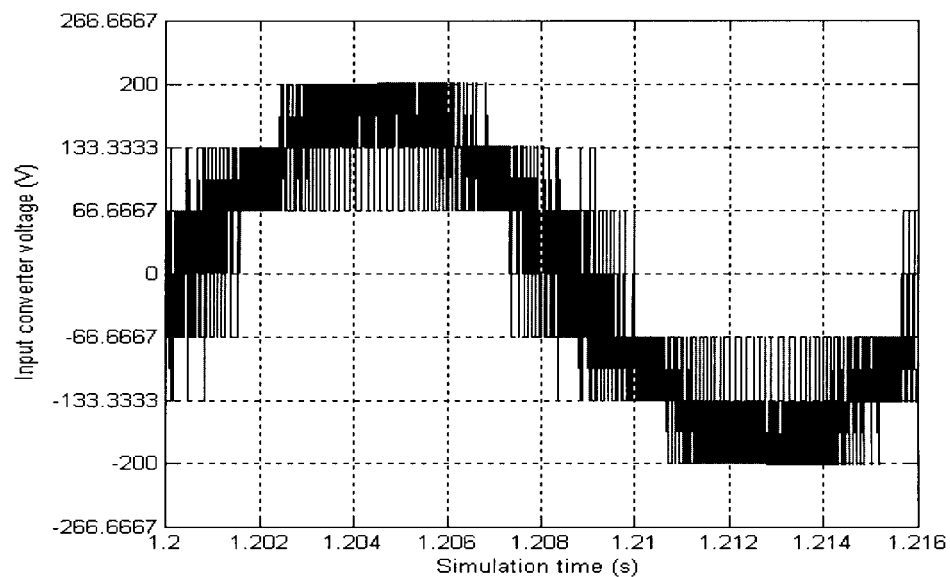
FIG. 14 is a graph showing the rectifier input voltage for the circuit of FIG. 10 for seven levels of operation.
Figure 15A:
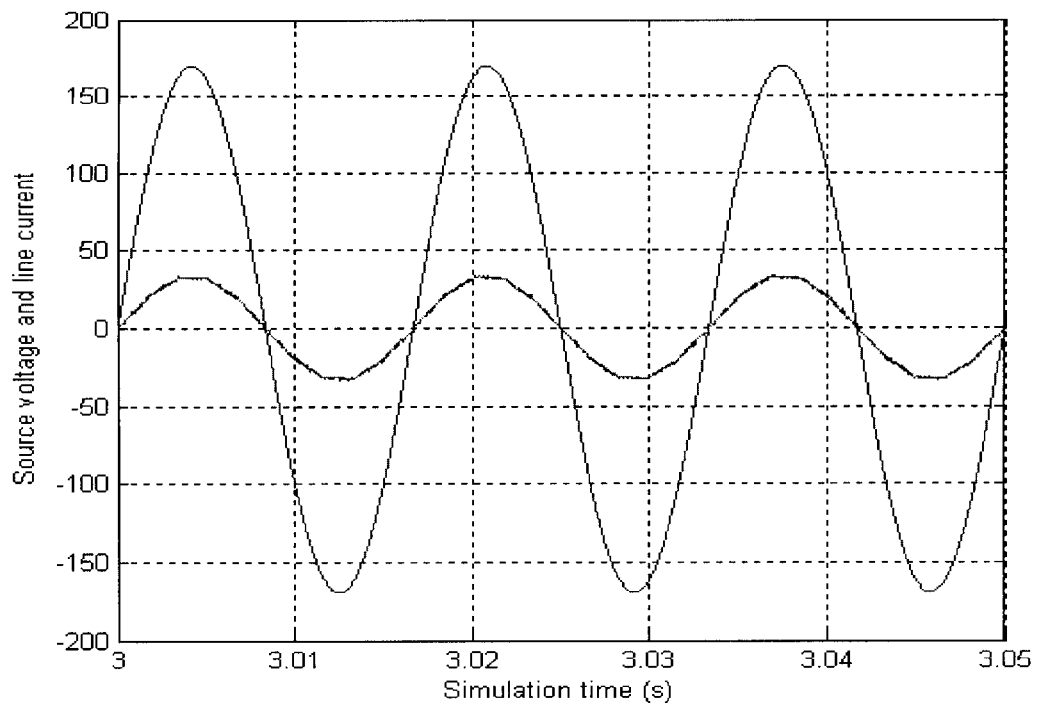
FIGS. 15a and 15b are graphs showing the source voltage and line current before and after load changes, respectively.
Figure 15B:
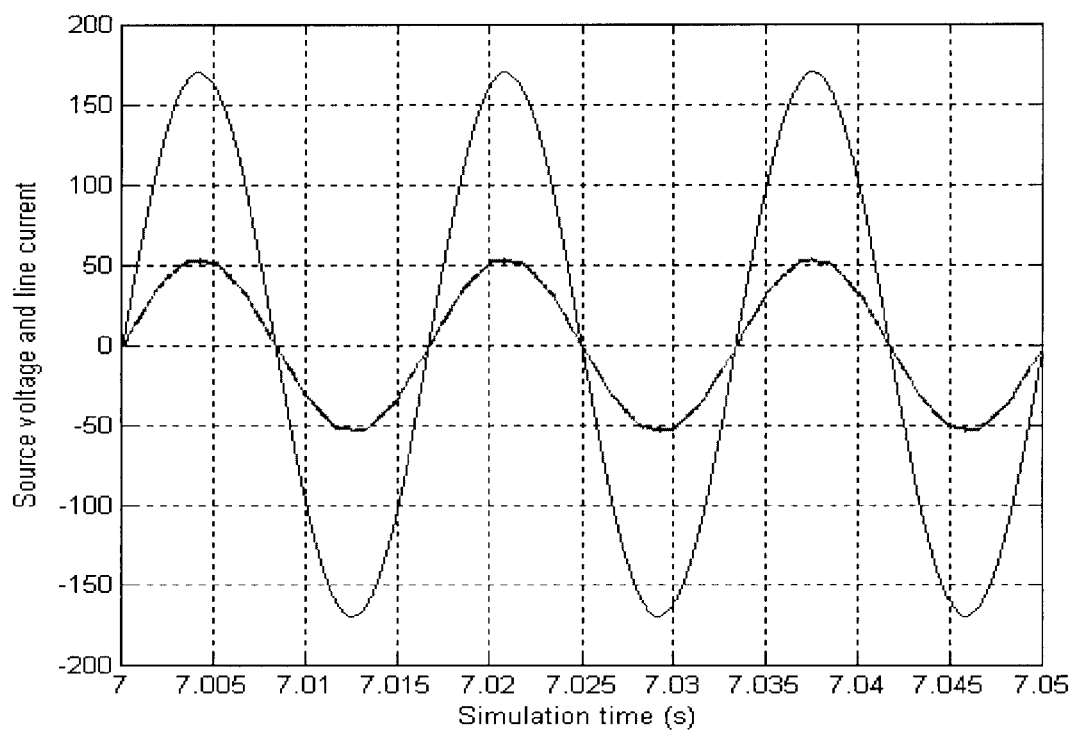
Figure 16:
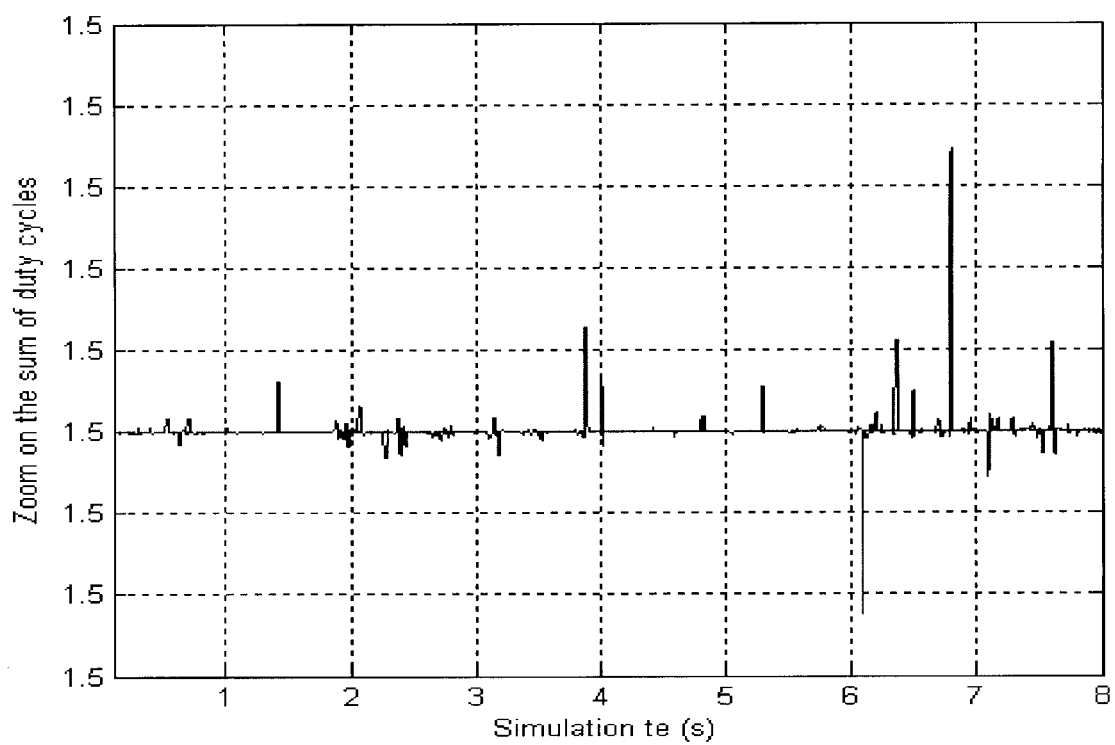
FIG. 16 is a graph showing a zoom on the sum of the duty cycles.

FIG. 14 shows the rectifier input voltage which is now constituted from seven levels. Thus, harmonic contents is improved compared to the five level of FIG. 12. The line current and source voltage are in phase even when the load and voltage reference change severely (see FIGS. 15a and 15b). This control strategy permits a unit power factor operation. The supposition of equation (17) is verified and the sum of duty cycles always remains around 1.5 even under severe output voltage and load variations (see FIG. 16).

Figure 17A:
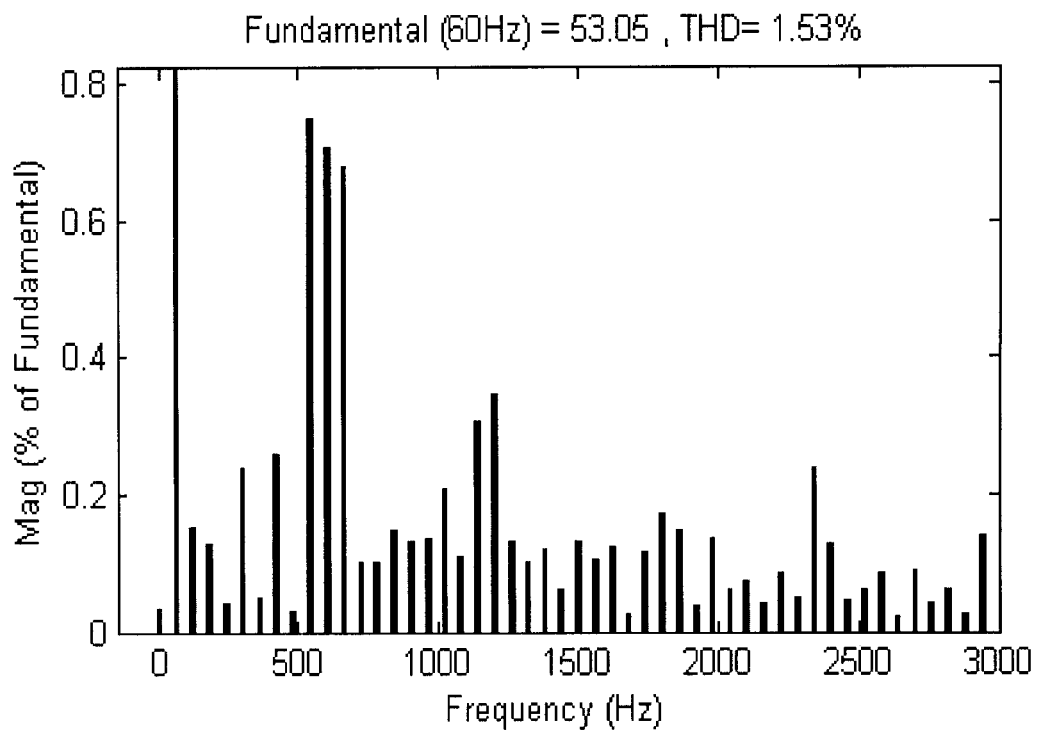
FIG. 17a is a graph showing harmonic contents of the line current before load change.
Figure 17B:
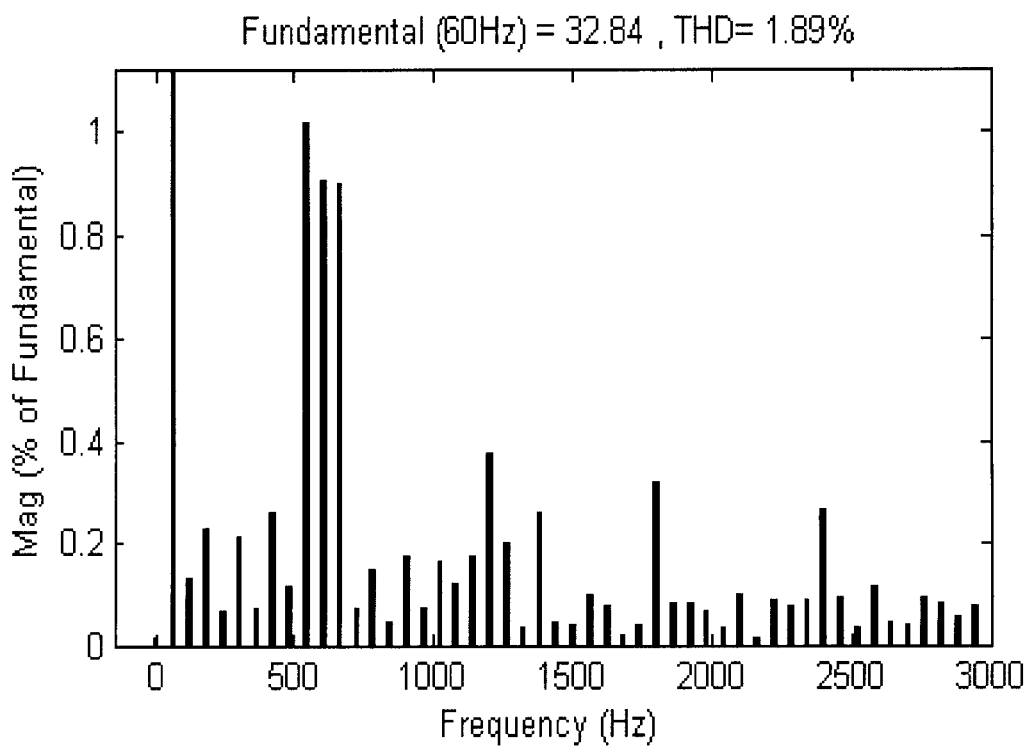
FIG. 17b is a graph showing harmonic contents of line current after load change.

FIGS. 17a and 17b show very low line current harmonic contents (as low as 1.53%). This shows that line current is perfectly sinusoidal. Harmonics are centered on multiples of the modulation frequency which is just ten times the utility supply frequency.

Figure 18:
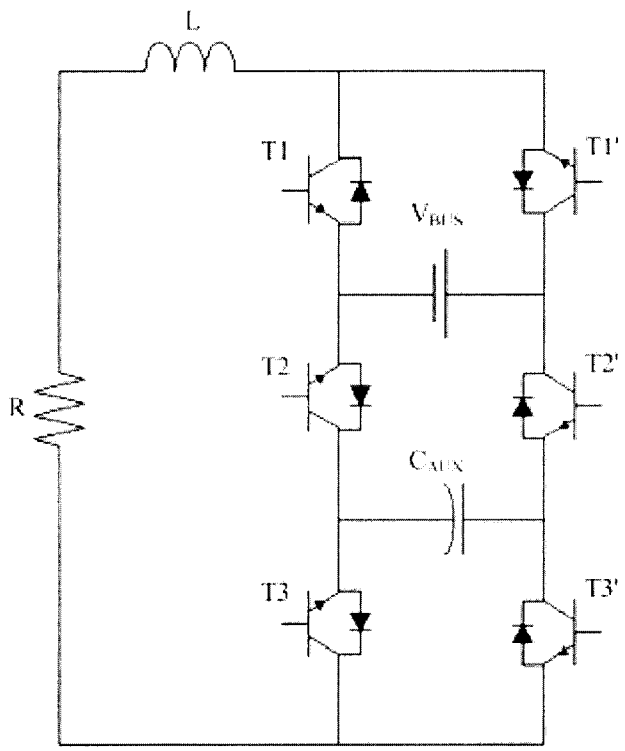
FIG. 18 is an exemplary circuit on which an instantaneous model is based for an alternative control strategy.

An alternative control strategy will now be described with respect to the multilevel inverter configuration shown in FIG. 18. Table 3 below illustrates the switching states of the inverter. First, the value of $V_{aux}$, the voltage across $C_{aux}$, is chosen such that the inverter will be a five-level inverter or a seven-level inverter. If $V_{aux}$ is half of $V_{BUS}$, then only five levels are present since two switching states will have the same values. In order to obtain seven levels, the value of $V_{aux}$ is set to be one third of $V_{BUS}$.

TABLE 3

| State | T1 | T2 | T3 | T1' | T2' | T3' | Output |
|---|---|---|---|---|---|---|---|
| 0 | 0 | 0 | 0 | 1 | 1 | 1 | 0 |
| 1 | 0 | 0 | 1 | 1 | 1 | 0 | $V_{AUX}$ |
| 2 | 0 | 1 | 0 | 1 | 0 | 1 | $(V_{BUS}-V_{AUX})$ |
| 3 | 0 | 1 | 1 | 1 | 0 | 0 | $V_{BUS}$ |
| -3 | 1 | 0 | 0 | 0 | 1 | 1 | $-V_{BUS}$ |
| -2 | 1 | 0 | 1 | 0 | 1 | 0 | $-(V_{BUS}-V_{AUX})$ |
| -1 | 1 | 1 | 0 | 0 | 0 | 1 | $-V_{AUX}$ |
| 0 | 1 | 1 | 1 | 0 | 0 | 0 | 0 |

Figure 19A:
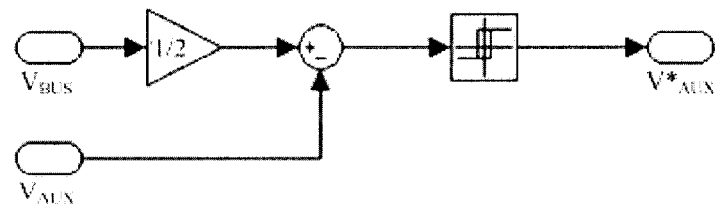
FIG. 19a is an exemplary circuit for a $V_{AUX}$ regulation 5-levels module.

Regulation of $C_{AUX}$ is done during states 1 and −1, when the capacitor is charged, and states 2 and −2, when the capacitor is discharged. A five level Pulse Width Modulation (PWM) as shown in FIG. 19a may be used with a hysteresis on the regulation of $V_{AUX}$.

A modulation index m may be found using the equation:

$$m = V_{rms}^* \cdot \frac{\sqrt{2}}{V_{BUS}}$$

Figure 19B:
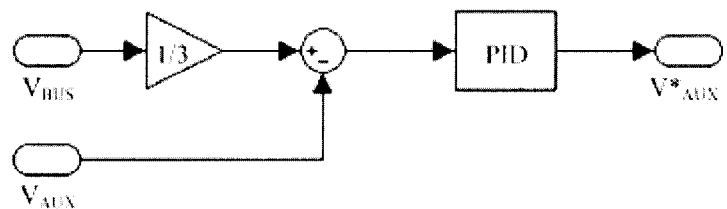
FIG. 19b is an exemplary circuit for a $V_{AUX}$ regulation 7-levels module.

In accordance with one embodiment, if the modulation index is at least 0.5, a seven level PWM may also be used. FIG. 19b illustrates the use of a Proportional-Integral-Derivative (PID) regulator to set $V_{AUX}$ to one third of $V_{BUS}$.

Figure 20A:
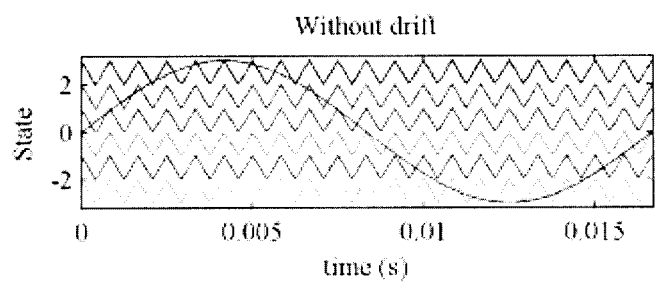
FIG. 20a illustrates different waveforms of a seven-level PWM without drift, in accordance with one embodiment.
Figure 20B:
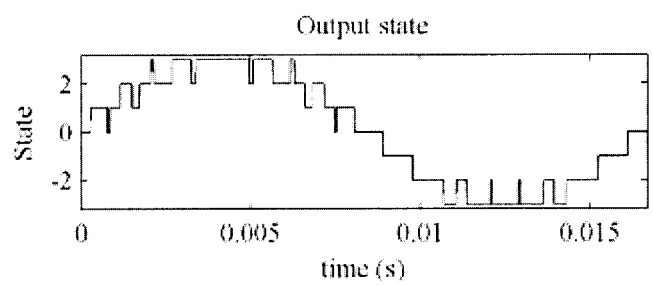
Figure 21A:
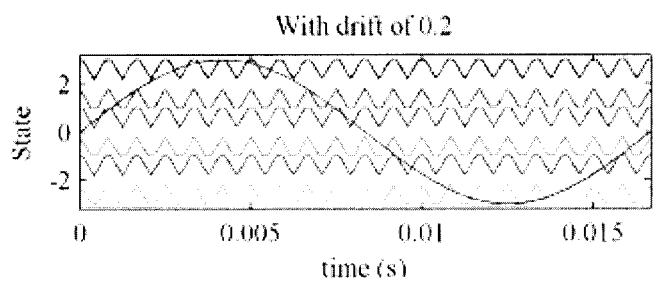
FIG. 21a illustrates different waveforms of a seven-level PWM with 20% drift, in accordance with one embodiment.
Figure 21B:
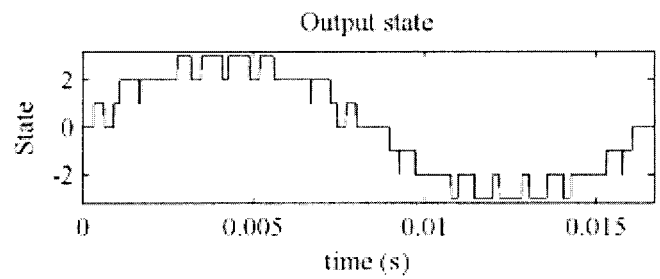
Figure 22A:
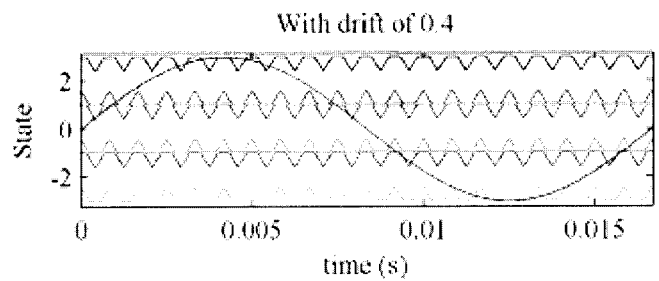
FIG. 22a illustrates different waveforms of a seven-level PWM with 40% drift, in accordance with one embodiment.
Figure 22B:
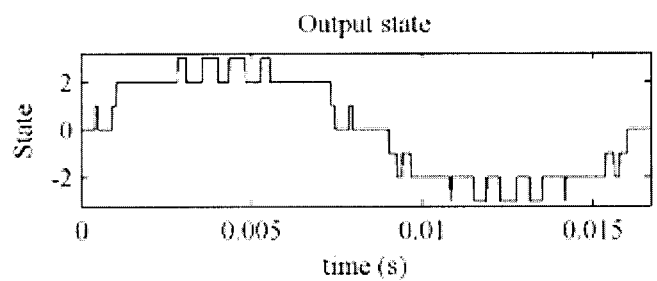
Figure 23:
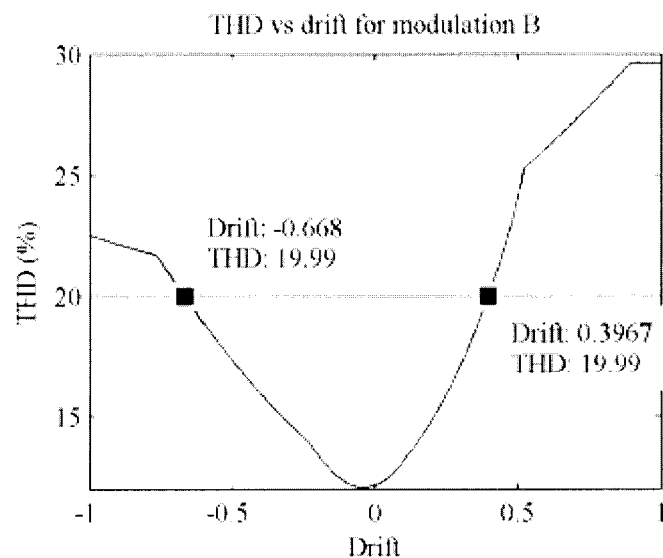
FIG. 23 is a graph illustrating the effect of the drift on THD.

FIG. 20a illustrates the different waveforms of a seven-level PWM, and FIG. 20b shows the output voltage. By adding drift to the offset, the result is to modify the duration of each state. By drifting the modulating waveform between state 1 and state 2, state 1 lasts longer. If it is drifted too much, state 2 will eventually be completely ignored. For the waveforms between 0 and 1 and between 2 and 3, respectively, a drift down causes state 1 to last longer and state 2 to be shorter. By doing so, the overall duration of state 1 is longer and the capacitor is discharged while $V_{AUX}$ is decreased. Similar logic may be applied to increase $V_{AUX}$. FIGS. 21a and 21b illustrate the effect of a 20% drift on the seven-level PWM waveforms and on the output voltage, respectively. FIGS. 22a and 22b illustrate the effect of a 40% drift on the seven-level PWM waveforms and on the output voltage, respectively. As shown, the effect on the output state is that for a positive drift, state 2 occurs more often and therefore $C_{AUX}$ is charged. Theoretically, the maximum drift would be of more or less one unit. However, doing so would have an undesirable effect on the total harmonic distortion (THD) and therefore should be restricted. FIG. 23 shows the effect of the drift on THD. By choosing a maximum of 20% THD, a minimum and maximum drift is obtained.

Figure 24:
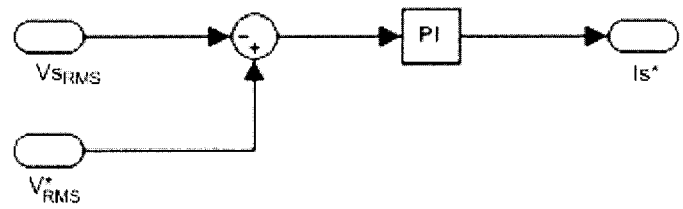
FIG. 24 is an exemplary circuit of an output regulation module.
Figure 25:
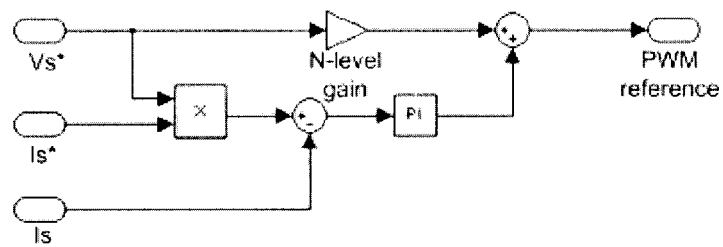
FIG. 25 is an exemplary circuit of a current regulation module.

The output voltage of the converter is regulated using a PI regulator to set a current reference, as shown in FIG. 24, followed by a regulation feed-forward on the reference of the PWM generator, illustrated in FIG. 25.

Figure 26:
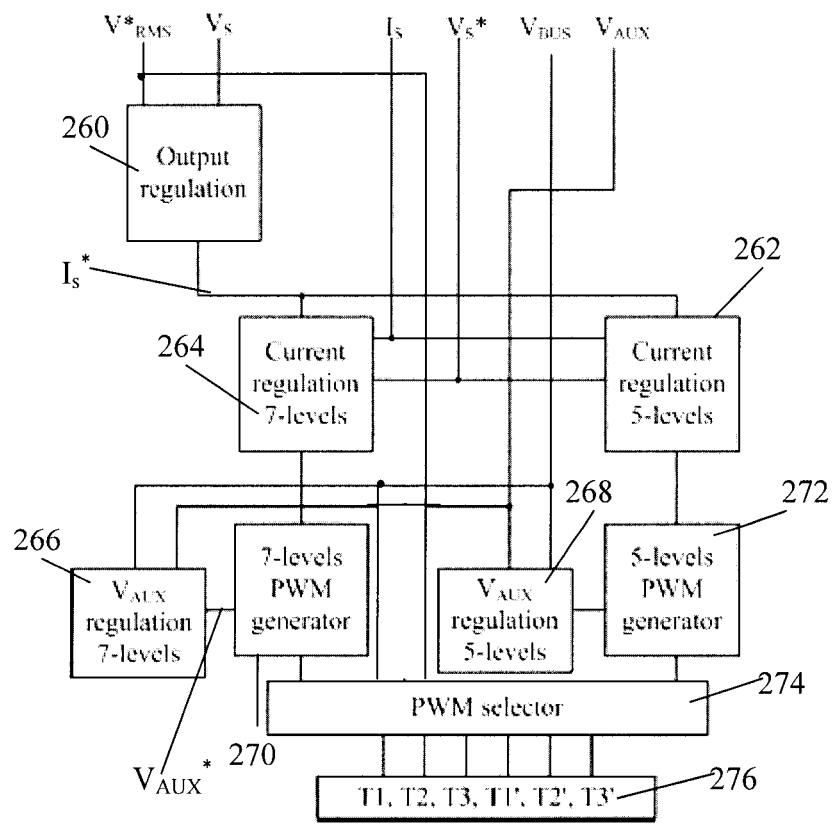
FIG. 26 is an alternative control strategy using a drifting PWM.
Figure 27:
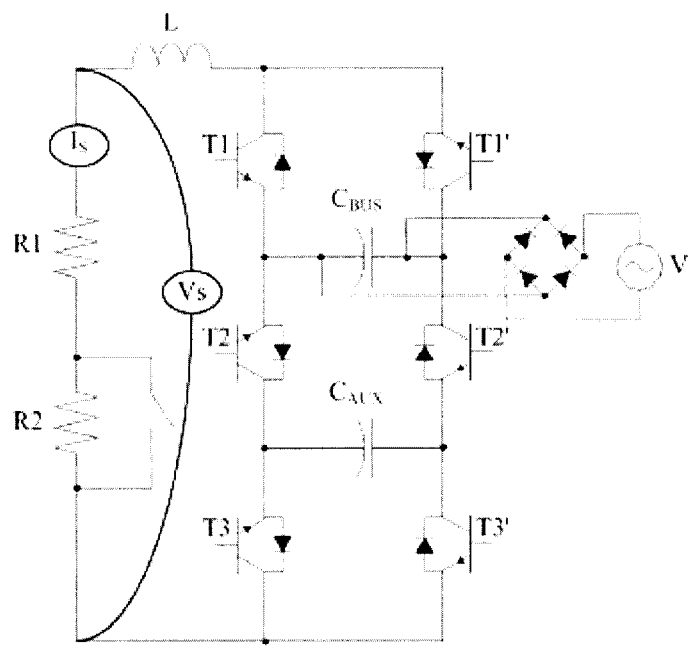
FIG. 27 is an exemplary circuit on which the control strategy of FIG. 26 is based.

FIG. 26 illustrates the complete control system for the inverter of FIG. 18 and will be described with respect to the circuit illustrated in FIG. 27. The output regulation module 260 may contain circuitry as illustrated in FIG. 24. It receives $V_s$, the voltage found across R1 and R2, and $V_{RMS}^*$, the desired reference voltage, and it outputs $I_S^*$. $I_S^*$ is fed to both the current regulation 5-levels module 262 and the current regulation 7-levels module 264, which may be configured as illustrated in FIG. 25. The N-level gain found in the circuit of FIG. 25 is set to 5 or 7 as appropriate in the corresponding module. Modules 262 and 264 each output a PWM reference signal, which is sent to a 7-levels PWM generator 270 and a 5-levels PWM generator 272, respectively. This reference signal is the sinusoidal waveform illustrated in the graphs of FIGS. 20a, 21a, 22a.

The $V_{AUX}$ regulation 7-level module 266 receives $V_{BUS}$ and $V_{AUX}$ and outputs $V_{AUX}^*$ as per FIG. 19b. The output $V_{AUX}^*$ corresponds to the drift index, as illustrated in FIGS. 21a and 22a. This drift index is combined with the PWM reference signal also found in FIGS. 21a and 22a and sent to the 7-level PWM generator 270 to generate the output waveform found in FIGS. 21b and 22b. This output waveform is then transmitted to the PWM selector 274.

The $V_{AUX}$ regulation 5-level module 268 receives $V_{BUS}$ and $V_{AUX}$ and outputs $V_{AUX}^*$ as per FIG. 19a. Since hysteresis is used for a 5-level converter instead of drift, as is used for a 7-level converter, the $V_{AUX}^*$ value output by module 268 corresponds to 0 or 1, depending on whether $C_{AUX}$ needs to be charged or discharge. This value is passed on to the 5-levels PWM generator 272. An appropriate output waveform corresponding to a 5-level signal is generated by the 5-levels PWM generator 272 and passed on to the PWM selector 274.

In addition to receiving both output voltage waveforms, one for the 7-level converter and one for the 5-level converter, the PWM selector 274 takes in $V_{BUS}$ and $V_{RMS}^*$ in order to calculate m, the modulation index. As indicated above, if the modulation index is below a certain value, it is desirable to use the converter in 5-level mode instead of 7-level mode. Therefore, the PWM selector 274 calculates the modulation index and as a function of a predetermined threshold, sends either the 5-level output voltage waveform or the 7-level output voltage waveform to the set of switches 276. The set of switches 276 are activated accordingly.

The control system of FIG. 26 may be designed such that the PWM selector 276 only receives the correct output voltage waveform instead of receiving both output voltage waveforms and selecting the appropriate one. Alternatively, the control system of FIG. 26 may be designed by combining some of the functions shown in the various modules and separating others.

Figure 28:
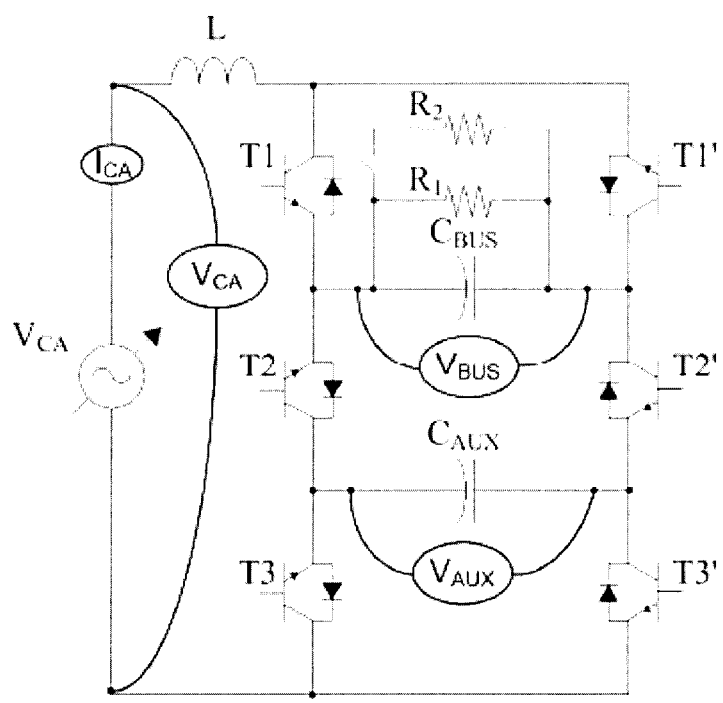
FIG. 28 is an exemplary rectifier circuit to apply the control system of FIG. 26.
Figure 29:
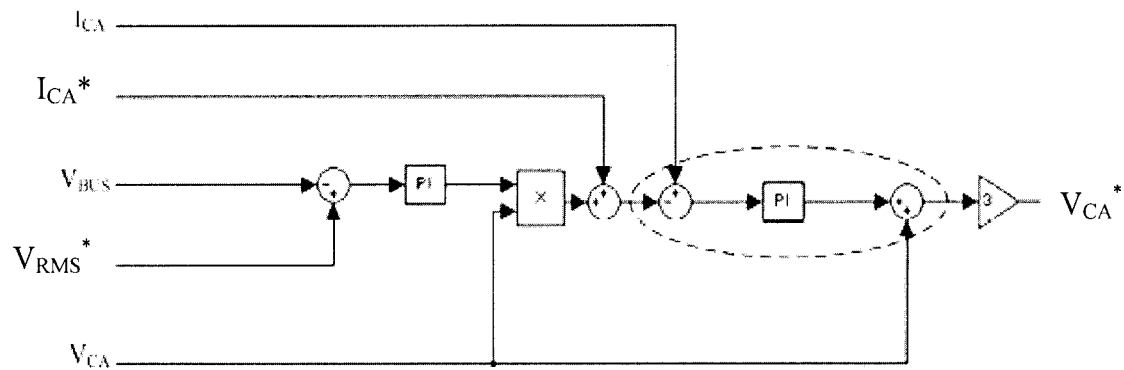
FIG. 29 is an exemplary circuit to regulate variables of the rectifier circuit of FIG. 28 when applying the control strategy of FIG. 26.
Figure 30:
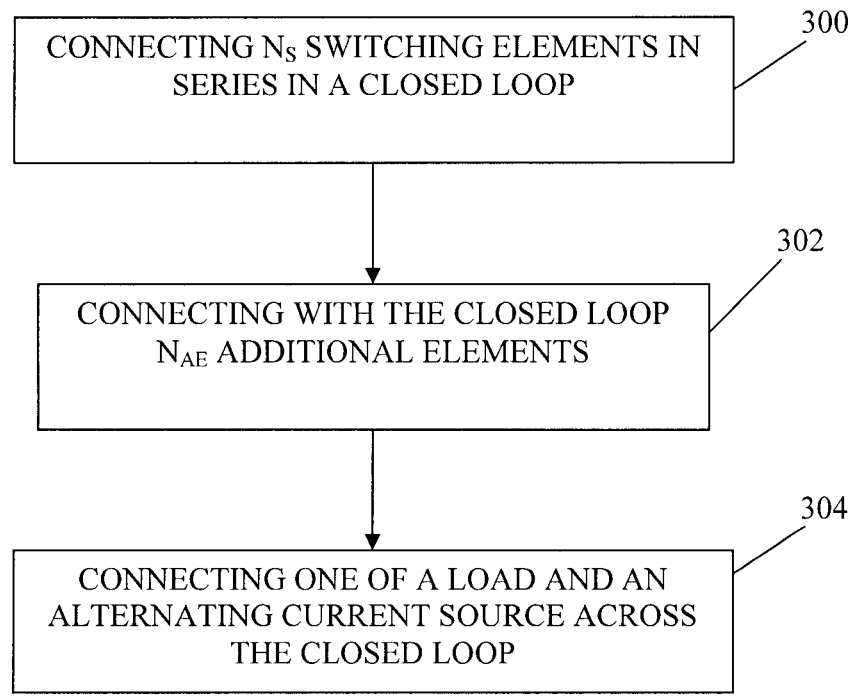
FIG. 30 is a flowchart of a method for providing a multi-level electric power converter circuit, in accordance with one embodiment.

It should be understood that this control strategy may be adapted to be used with a rectifier. For example, it may be applied to the rectifier circuit illustrated in FIG. 28. For a rectifier circuit, the circuit may always operate in 7-level mode. The current consumed by the converter is controlled and therefore, the converter may also be used to increase the power factor or correct THD in the network. FIG. 29 illustrates an exemplary circuit to regulate $C_{BUS}$ and $I_{CA}$. By adding harmonics with the proper phase to the reference current, the converter can improve THD in the network. In order to regulate $C_{AUX}$, the same method as that used for the inverter circuit may be applied. The differences lie in the states during which the capacitor will charge and discharge. In a rectifier circuit, the voltage source is applied to $C_{AUX}$ during states 1 and −1, which means that the reference waveform should be shifted downwards between states 1 and 0 to increase the voltage across $C_{AUX}$. $V_{AUX}$ is compared to one third of the value of $V_{BUS}$ and a PI regulator will generate the shifting index that should be used.

Using this control strategy, very low THD is achieved without any filtering and all harmonics are around the modulating frequency, which is about ten times the frequency of the desired output. Table 4 illustrates the results of a simulation with a set of specific values for each variable.

TABLE 4

| Variable | 1 | 2 | 3 | 4 | 5 |
|---|---|---|---|---|---|
| $V_{BUS}$ | 85 | 170 | 170 | 170 | 170 |
| $V_s$ | 55 | 55 | 55 | 110 | 110 |
| Load (Ohms) | 27 | 27 | 20 | 20 | 27 |
| # of Levels | 7 | 5 | 5 | 7 | 7 |
| TDH of current | 2.97% | 4.60% | 3.76% | %1.37 | %1.64 |

The TDH is higher between the $2^{nd}$ and the $4^{th}$ second since the converter works only with 5 output voltage levels. By increasing the output, 7 levels of output voltage are obtained and TDH is reduced. The best TDH results are obtained when the current is higher, which can be explained by the ratio between the resistance of the load and the smoothing inductance that filters the current.

In addition to the above-described control strategies, various other control techniques may be used, whether they are PWM, Selective Harmonics Elimination PWM, or Optimized Harmonics Stepped Waveform. PWM such as the Shift PWM technique, the Sinusoidal Natural PWM technique, and the Programmed PWM technique may be used. Open loop and closed loop techniques may be used. Examples of Open loop techniques are Space Vector and Sigma Delta. Examples of Closed loop techniques are Hysteresis Current Controller, Linear Current Controller, DDB Current Controller, and Optimized Current Controller. All of these techniques may be applied to the multilevel electric power converter in inverter mode as well as in rectifier mode, as will be understood by those skilled in the art.

The number of voltage levels of the present multilevel electric power converter follows a geometrical series of the form:

$$u_n = a \cdot u_{(n-1)} + b$$

$$u_0 = U \quad (20)$$

The general term can be written as follows:

$$u_n = a^n U + b \frac{1-a^n}{1-a} \quad (21)$$

Therefore:

$$N = 2^{N_{AE}+1} - 1 \quad (22a)$$

$N_{AE}$ being the number of capacitors/batteries (additional elements and N being the number of voltage levels, and:

$$N = 2^{\frac{N_S}{2}} - 1 \quad (23b)$$

$N_S$ being the number of switches. The ratio of switches to capacitors/batteries corresponds to the following: $N_S = 2N_{AE} + 2$. This causes the following ratios to be maintained: 6:2, 8:3, 10:4, 12:5, etc. Each additional stage adds 2 switches and 1 additional element.

The gain and the number of additional elements (capacitors/batteries) as a function of the wave quality is governed by the following law:

$$g_c = N - \log_2(N+1) \quad (24)$$

where:

$$\log_2(x) = \frac{\log(x)}{\log(2)}$$

The gain in acquisition costs in terms of capacitors/batteries can be expressed with the following relationship:

$$g_{cc} = (N - \log_2(N+1)) \times puc \quad (25)$$

where "puc" is the unit price of a capacitor/battery.
This represents a gain in percentage of:

$$g_c(\text{in }\%) = 100 \times \frac{N - \log_2(N+1)}{\log_2(N+1) - 1} \quad (26)$$

For example, to obtain a waveform with thirty-one voltage levels (N=31), using the present multilevel electric power converter results in a gain of $g_c = N - \log_2(N+1) = 31 - \log_2(32) = 26$ capacitors/batteries, which leads to a gain of:

$$g_c(\text{in }\%) = 100 \times \frac{N - \log_2(N+1)}{\log_2(N+1) - 1} = 100 \times \frac{31 - \log_2(32)}{\log_2(32) - 1} = 650\%$$

That is to say, if a competing topology with flying capacitors is chosen, the amount wasted will be $g_{cc} = (N - \log_2(N+1)) \times puc = 26 \times$ the price of one capacitor.

The gain in terms of number of switches (IGBT, MOS, Thyristors, BJT, etc) as a function of the quality of the desired waveform is governed by the following law:

$$g_s = 2 \times (N - 1 - \log_2(N+1)) \quad (27)$$

The gain in acquisition costs in terms of switching components can be expressed by the following relationship:

$$g_{sc} = (2 \times (N - 1 - \log_2(N+1))) \times pucc \quad (28)$$

where "pucc" is the unit price of a switching component.
This represents a gain in percentage of:

$$g_s(\text{in }\%) = 100 \times \frac{2 \times (N - 1 - \log_2(N+1))}{2 \times \log_2(N+1)} \quad (29)$$

For example, to obtain a waveform with thirty-one voltage levels, use of the present multilevel electric power converter results in a gain of $g_s = 2 \times (N-1-\log_2(N+1)) = 2 \times (31-1-\log_2(32)) = 50$ switching components, which means a gain of:

$$\begin{aligned} g_s(\text{in }\%) &= 100 \times \frac{2 \times (N - 1 - \log_2(N+1))}{2 \times \log_2(N+1)} \\ &= 100 \times \frac{2 \times (31 - 1 - \log_2(32))}{2 \times \log_2(32)} \\ &= 500\% \end{aligned}$$

That is to say that by choosing a competing topology with flying capacitors, we will have wasted $g_{sc} = (2 \times (N-1-\log_2(N+1))) \times pucc = 50 \times$ the price of a unitary switching component. This amount is in addition to the amount wasted for the twenty-six previous capacitors.

The number of voltage levels of a flying capacitor converter is governed by the following equation: $N2 = N_c + 1$, $N_c$ being the number of capacitors.

The gain in wave quality evolves according to the following law:

$$g_q = 2^{N_c+1} - N_c - 2 \quad (30)$$

By using the present multilevel electric power converter, we will have an electric wave cleaner by $$100 \times \frac{2^{N_c+1} - N_c - 2}{N_c + 1} \%$$

or with a gain of $g_q$ voltage levels, which allows the elimination of anti-pollution filters and thereby reduces the cost of installation. For example, for a number of capacitors equal to three ($N_c = 3$), use of the present multilevel electric power converter results in a gain of $g_q = 2^{N_c+1} - N_c - 2 = 2^{3+1} - 3 - 2 = 11$ levels, which means that if a competing topology with flying capacitors was chosen, we would have obtained an electric waveform with only four levels.

Therefore, an embodiment of a method for providing the present multilevel electric power converter consists in connecting $N_s$ switching elements in series in a closed loop 300. The closed loop is illustrated in at least FIGS. 1, 2, and 3. $N_{AE}$ additional elements are then connected within the closed loop 302. The additional elements may be a direct current source or one or more passive elements, such as capacitors, resistors, and inductors. Each additional element is connected to four of the switching elements, and the ratio of a number of additional elements $N_{AE}$ to a number of switching elements $N_S$ corresponding to $N_S = 2N_{AE} + 2$. Finally, a load or an alternating current source is connected across the closed loop at nodes between adjacent switching elements that are separate from nodes to which the additional elements are connected 304.

In one embodiment, the method also comprises a step of selecting a number of voltage levels N for the converter. Once the voltage levels are selected, a number of additional elements for the converter circuit are determined in order to match the selected number of voltage levels in accordance with: $N=2^{N_{AE}+1}-1$. A number of switching elements is also determined for the converter circuit to match the selected number of voltage levels in accordance with $$N = 2^{\frac{N_S}{2}} - 1.$$

In another embodiment, it is the number of switching elements that is first selected, and the number of additional elements that is determined as a function of the selected number of switching elements. The number of voltage levels is thus fixed. In yet another embodiment, the number of additional elements is selected and the number of switching elements is determined as a function of the selected number of additional elements. Any one of the three variables, namely number of levels, number of switching elements, and number of additional elements, may be selected, thereby fixing the other two variables.

The method may also include a step of controlling the switching elements using a control strategy, such as the control strategies described above.

While the circuits illustrated in the figures show single phase converters, it should be understood that the method, circuit topologies, and control strategies may be adapted to three phase converters without deviating from the scope of the present invention.

It should be understood that there is no set order to the steps of this method, as one or two of the variables may be previously set and the remaining two or one variable can be determined as a function of these set variables. It should also be understood that if all variables may be selected freely without constraint, the number of capacitors/batteries and the number of switches are determined independently from each other and in no particular order.

The embodiments of the invention described above are intended to be exemplary only. The scope of the invention is therefore intended to be limited solely by the scope of the appended claims.

We claim:

1. A multilevel electric power converter circuit comprising:
   $N_s$ switching elements connected in series in a closed loop having only the Ns switching elements;
   $N_{AE}$ additional elements, the additional elements being one of a direct current source and at least one passive element, connected within the closed loop such that each additional element is connected to four of the switching elements of the closed loop and none of the additional elements share a common node, the ratio of a number of additional elements $N_{AE}$ to a number of switching elements $N_S$ corresponding to $N_S = 2N_{AE}+2$, the converter circuit performing conversion between direct current (DC) and alternating current (AC) and outputting given voltage levels as a result of selective opening and closing of the switching elements;
   a load connected across the closed loop at nodes between adjacent switching elements that are separate from nodes to which the additional elements are connected when the multilevel electric power converter operates in an inverter mode; and
   an alternating current source connected across the closed loop at the nodes between adjacent switching elements that are separated from nodes to which the additional elements are connected when the multilevel electric power converter operates in a rectifier mode.

2. The circuit of claim 1, wherein the switching elements are transistors with parasitic diodes that are reverse biased.

3. The circuit of claim 1, wherein the at least one passive element is a capacitor.

4. The circuit of claim 1, wherein the multilevel electric power converter circuit operates as both a five-level converter and a seven-level converter.

5. The circuit of claim 1, further comprising a control circuit to operate the switching elements.

6. The circuit of claim 5, wherein the control circuit is based on an average model that uses state variables as inputs.

7. The circuit of claim 5, wherein the control circuit is adapted to change a number of voltage levels by varying a ratio $k=x_{3ref}/x_{2ref}$, $x_{2ref}$ corresponding to a desired DC bus voltage and $x_{3ref}$ corresponding to an auxiliary voltage.

8. The circuit of claim 5, wherein the control circuit is based on an instantaneous model that regulates current and voltage for a five-level converter and a seven-level converter independently and generates an output voltage using Pulse Width Modulation.

9. The circuit of claim 8, wherein an output voltage is generated for each one of the five-level converter and seven-level converter, and the appropriate output voltage is applied to the circuit.

10. The circuit of claim 9, wherein the appropriate output voltage is selected using a modulation index m compared to a predetermined threshold.

11. The circuit of claim 10, wherein the modulation index m is determined according to $$m = V_{rms}^* \cdot \frac{\sqrt{2}}{V_{BUS}},$$

$V_{rms}^*$ corresponding to a desired reference voltage, $V_{BUS}$ corresponding to a DC bus voltage.

12. The circuit of claim 1, wherein the converter is an N level converter, and the number of switching elements and additional elements corresponds to: $N=2^{N_{AE}+1}-1$, $$N = 2^{\frac{N_S}{2}} - 1.$$

13. A method for providing a multilevel electric power converter circuit, the method comprising:
   connecting $N_s$ switching elements in series in a single closed loop having only the Ns switching elements;
   connecting within the closed loop $N_{AE}$ additional elements, the additional elements being one of a direct current source and at least one passive element, each additional element being connected to four of the switching elements of the closed loop with none of the additional elements sharing a common node, the ratio of a number of additional elements $N_{AE}$ to a number of switching elements $N_S$ corresponding to $N_S=2N_{AE}+2$, the converter circuit performing conversion between direct current (DC) and alternating current (AC) and outputting given voltage levels as a result of selective opening and closing of the switching elements; and
   connecting one of a load and an alternating current source across the closed loop at nodes between adjacent switching elements that are separate from nodes to which the additional elements are connected;

wherein when the load is connected across the closed loop, the multilevel electric power converter operates in an inverter mode and when the alternating current source is connected across the closed loop, the multilevel electric power converter operates in a rectifier mode.

14. The method of claim 13, further comprising:
selecting a number of voltage levels N for the converter circuit;
   determining a number of additional elements $N_{AE}$ for the converter circuit to match a selected number of voltage levels in accordance with: $N=2^{N_{AE}+1}-1$;
determining a number of switching elements $N_S$ for the converter circuit to match the selected number of voltage levels in accordance with $$N = 2^{\frac{N_S}{2}} - 1.$$

15. The method of claim 13, further comprising:
selecting a number of switching elements for the converter circuit;
determining a number of additional elements for the converter circuit to match the selected number of switching elements.

16. The method of claim 13, further comprising:
selecting a number of additional elements for the converter circuit;
determining a number of switching elements for the converter circuit to match the selected number of additional switching elements.

17. The method of claim 13, further comprising controlling the switching elements using a control strategy.

18. The method of claim 17, wherein the control strategy is based on an average model that uses state variables as inputs.

19. The method of claim 17, wherein the control strategy is adapted to change a number of voltage levels by varying a ratio $k=x_{3ref}/x_{2ref}$, $x_{2ref}$ corresponding to a desired DC bus voltage and $x_{3ref}$ corresponding to an auxiliary voltage.

20. The method of claim 17, wherein the control strategy is based on an instantaneous model that regulates current and voltage for a five-level converter and a seven-level converter independently and generates an output voltage using Pulse Width Modulation.

21. The method of claim 20, wherein an output voltage is generated for each one of the five-level converter and seven-level converter, and the appropriate output voltage is applied to the circuit.

22. The method of claim 21, wherein the appropriate output voltage is selected using a modulation index m compared to a predetermined threshold.

23. The method of claim 22, wherein the modulation index m is determined according to $$m = V_{rms}^* \cdot \frac{\sqrt{2}}{V_{BUS}},$$

$V_{rms}^*$ corresponding to a desired reference voltage, $V_{BUS}$ corresponding to a DC bus voltage.

24. The method of claim 13, wherein the converter is an N level converter, and the number of switching elements and additional elements corresponds to: $N=2^{N_{AE}+1}-1$, $$N = 2^{\frac{N_S}{2}} - 1.$$

* * * * *